United States Patent [19]

Hara et al.

[11] 4,069,206

[45] Jan. 17, 1978

[54] NOVEL AROMATIC IMINE POLYMERS AND PROCESS FOR THE PREPARATION THEREOF

[75] Inventors: Shigeyoshi Hara, Hino; Masao Senoo, Ehime; Koh Mori; Yutaka Taketani, both of Hino, all of Japan

[73] Assignee: Teijin Limited, Osaka, Japan

[21] Appl. No.: 550,738

[22] Filed: Feb. 18, 1975

[30] Foreign Application Priority Data

Feb. 20, 1974  Japan ................................. 49-19373

[51] Int. Cl.² .................. C08G 73/02; C08G 75/23
[52] U.S. Cl. ................ 260/49; 260/47 CZ; 260/47 CB; 260/47 CD; 260/61; 260/63 HA; 260/65; 260/77.5 R; 260/78 A; 260/78 TF
[58] Field of Search .............. 260/2 R, 78.3 R, 78 A, 260/47 CP, 47 CB, 47 CZ, 47 P, 49, 61, 79.3 M, 63 HA, 77.5 R, 65, 78 TF

[56] References Cited

U.S. PATENT DOCUMENTS

3,806,494  4/1974  Zellner ............................. 260/78 TF

*Primary Examiner*—Lester L. Lee
*Attorney, Agent, or Firm*—Sherman & Shalloway

[57] ABSTRACT

Novel aromatic imine polymers containing as at least a part of its entire recurring units an aromatic imino group

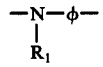

wherein $\phi$ is an aromatic ring group having a valence of at least two and has at least one electron-attracting group with respect to the group

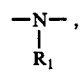

and $R_1$ is a hydrogen atom or a non-aromatic hydrocarbon residue having a valence of at least 1. These polymers find a wide variety of applications by utilizing their thermal stability and various other desirable properties such as reducibility or photosensitivity. The polymers are prepared by reacting specific aromatic dihalogen compound with specific difunctional amino-containing compounds in an inert organic solvent in the presence of an acid acceptor. Copolymers can be obtained by carrying out the reaction using specific difunctional comonomers.

32 Claims, No Drawings

NOVEL AROMATIC IMINE POLYMERS AND PROCESS FOR THE PREPARATION THEREOF

This invention relates to novel aromatic imine polymers and a process for their preparation. More specifically, this invention relates to novel substantially linear polymers containing in the main chain a secondary or tertiary amino group directly bonded to aromatic nucleus (to be referred to as an aromatic imino group), and to a process for preparing these polymers.

It has been well known previously that aromatic polyethers can be obtained by a nucleophilic substitution reaction of aromatic dihalogen compounds containing halogens directly substituted at the aromatic nucleus using bisphenolates as nucleophilic reagents. The most typical method for obtaining the above aromatic polyethers comprises reacting 4,4'-dichlorodiphenylsulfone with a bisphenolate. The reaction of forming these aromatic polyethers proceeds with especially good efficiency to give polymers with high degrees of polymerization when it is carried out in the presence of an aprotic polar solvent. Admittedly, the effect of using aprotic polar solvents is to promote the reaction by increasing the nucleophilicity of the phenolate anions.

Attempts have seldom been made to obtain polyimines by using a diamine as a nucleophilic reagent in the above reaction instead of the bisphenolates. The only prior art of this kind, of which we are aware, is found in D. F. Kutepou et al., Vysokomol. Soed. Ser. B 12, 344 (1970) which discloses the preparation of polyimines by reacting dichlorinated compounds of S-triazine with diamines. However, aromatic dihalogen compounds of the benzene series are not used in this reaction, and the resulting polymers have low viscosity.

In fact, we attempted to react 4,4'-dichloro-(or difluoro-) diphenylsulfone with an aliphatic or aromatic diamine in an aprotic polar solvent; but the reaction scarcely proceeded and the attempt failed.

In spite of the fact that amines generally have a greater nucleophilicity than phenols, polymers with high degrees of polymerization cannot be obtained by the above method. We assume that the phenols become phenolate anions and when activated with aprotic polar solvents, attain a higher nucleophilicity than the amines.

We therefore thought that because it is difficult to give rise to an accelerating phenomenon with the amino groups of amines unlike the case of the phenols, the reactivity of the dihalogen compound to be reacted with the diamine must be increased in order to obtain highly polymerized polymers. Extensive investigations based on this thought finally led to the discovery that linear aromatic imine polymers having a high degree of polymerization can be easily obtained by reacting specific aromatic dihalogen compounds with diamines.

The aromatic imine polymers of this invention are characterized by containing an aromatic imino group of the formula

wherein $\phi$ is an aromatic ring group having a valence of at least two and has at least one electron-attracting group with respect to the group

and $R_1$ is a hydrogen atom or a non-aromatic hydrocarbon residue having a valence of at least 1 (which may have an inert substituent), as at least a part of its entire recurring units. It is our belief that these aromatic imines are novel polymers that have not been described in literature prior to the present invention.

Accordingly, it is an object of this invention to provide the above novel aromatic imine polymers and a process for preparing these polymers.

Another object of this invention is to provide novel homopolymers or copolymers containing the above aromatic imino group in an amount of at least 20% by weight of the entire recurring units.

The other objects and advantages of this invention will become apparent from the following description.

The aromatic imine polymers of this invention are characterized by containing a recurring unit of the following formula $$\text{-[R—Y}_1\text{—Ar(Z)}_p\text{Y}_2\text{]-} \qquad (I)$$

wherein Z is —SO$_2$— or —CO—; p is 0 or 1, and when p is 0, —Ar— is directly bonded to —Y$_2$—; Ar is a divalent aromatic group not containing a primary or secondary amino group, a hydroxyl group, or a group substantially reactive with said amino and hydroxyl groups; Y$_1$ and —(Z)$_p$Y$_2$ are bonded respectively to the nuclear carbon atoms of the aromatic ring, and when p is 0, Ar has an electron-attracting group capable of causing the nuclear carbon atoms to which Y$_1$ and Y$_2$ are bonded to have a Hammet $\sigma$ constant of substantially at least +1, and when p is 1, Ar has an electron-attracting group capable of causing the nuclear carbon atoms to which Y$_1$ is bonded to have a Hammet $\sigma$ constant of substantially at least +1; Y$_1$ represents the group

and Y$_2$ represents the group

or —O—, in which R$_1$ and R$_2$ are identical or different, and represent a hydrogen atom or a monovalent or divalent hydrocarbon residue, and when one or both of R$_1$ and R$_2$ are divalent hydrocarbon residues, R$_1$ and/or R$_2$ can be bonded to R or bonded directly to each other; and R is an organic group having a valence of 2, 3 or 4 according to the definition of R$_1$ and R$_2$ i.e. when both of R$_1$ and R$_2$ are a hydrogen atom or a monovalent aliphatic hydrocarbon group, R is a divalent organic group; when one of R$_1$ and R$_2$ is a divalent hydrocarbon group and the other is a hydrogen atom or monovalent hydrocarbon group, R is a trivalent organic group; when both of R$_1$ and R$_2$ are a divalent hydrocarbon group, R is a divalent or tetravalent organic group.

Suitable electron-attracting groups attached to Ar are those capable of causing the nuclear carbon atoms to which $Y_1$ and $Y_2$ are bonded (in the case of $p=0$) or the nuclear carbon atom to which $Y_1$ is bonded (in the case of $p=1$) to have Hammet $\sigma$ constant of at least 1.2, especially at least 1.4.

Examples of suitable electron-attracting groups attached to Ar are nitro, cyano, sulfone, sulfonic acid ester, sulfonamide, carboxylic acid ester, carboxamide, carboimide and ketone groups.

Sulfonic acid, carboxyl and aldehyde groups can also be used as the electron-attracting groups although these groups are less influential on the Hammet $\sigma$ constant of the nuclear carbons.

Preferred aromatic imine polymers of this invention comprising a recurring unit of formula (I) are those in which —Ar— is expressed by the following formula

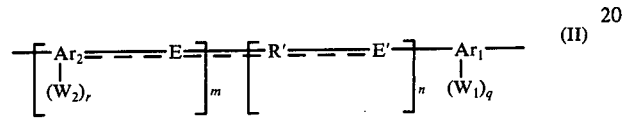
(II)

wherein $Ar_1$ is an aromatic ring group containing 6 to 20 carbon atoms and having a valence of $(q + 2)$ or $(q + 3)$; $Ar_2$ is an aromatic ring group containing 6 to 20 carbon atoms and having a valence of $(r + 2)$ or $(r + 3)$; $W_1$ and $W_2$ are identical or different electron-attracting groups defined above, and preferably selected from nitro, cyano, sulfonic acid ester, sulfonamide, sulfonic acid, carboxylic acid ester, carboxamide and carboxyl groups; $q$ and $r$ are identical or different and each represent 1, 2, 3 or 4; $m$ and $n$ are 0 or 1, and when $m$ is 0, $n$ is also 0; the symbol . . . represents the presence or absence of a bond; E and E' are identical or different non-aromatic bridging groups, preferably selected from

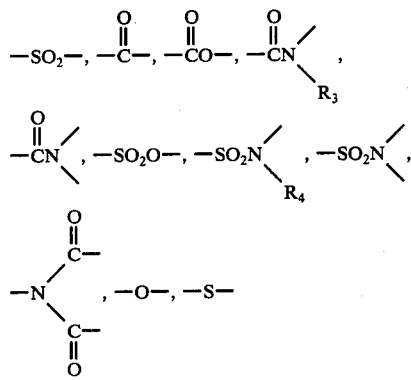

and alkylene groups containing 1 to 6 carbon atoms, $R_3$ and $R_4$ being identical or different and representing a hydrogen atom or an organic group containing 1 to 6 carbon atoms, preferably an alkyl group containing 1 to 3 carbon atoms; and R' is an organic group containing 2 to 30 carbon atoms and having a valence of 2 to 4 or represents two divalent alkylene groups. In the above formula (I), R is preferably an organic group containing 2 to 50 carbon atoms.

Especially preferred species of aromatic imine polymers comprising a recurring unit of formula (I) are those in which Ar is expressed by formula (II) above wherein $Ar_1$ and $Ar_2$ are at least one member selected from benzene, naphthalene and biphenyl, $W_1$ and $W_2$ represent a nitro, cyano or sulfone group and E and E' represent

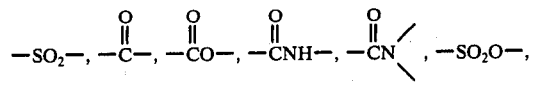

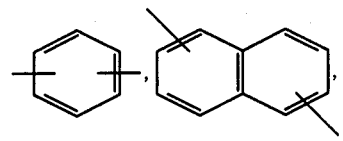 ; and in which —R— represents

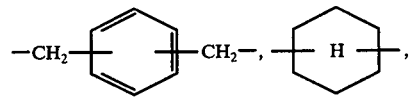

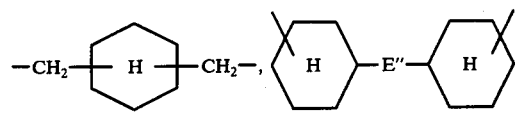

wherein E" is a non-aromatic bridging group same as E or E', and preferred E" groups are those exemplified with regard to E or E' (these R groups may have an inert substituent such as a halogen atom, or a alkyl or alkoxy group containing 1 to 4 carbon atom), or an alkylene group containing 2 to 15 carbon atoms.

Preferred —R'— groups are the same as those exemplified with regard to —R— groups.

As previously stated, $Y_1$ and $Y_2$ in formula (I) together form a group expressed by the formula $$-Y_2-R-Y_1-$$ (III)

in which $R_1$ and $R_2$ of $Y_1$ and $Y_2$ can be bonded directly to each other to form a group of the formula

(IIIa)

A suitable group of formula (IIIa) is a piperazinyl group of the formula

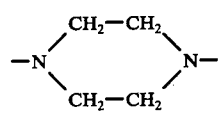

or

-continued

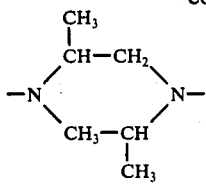

The aromatic imine polymers of this invention can be either homopolymers in which substantially all of the recurring units consist of the unit of formula (I), or copolymers in which the unit of formula (I) is contained in a proportion of at least 20 mol%, preferably at least 30 mol%, especially preferably at least 50 mol%, of the entire recurring units.

Preferred aromatic imine copolymers are those in which 1. at least 20 mol% of the entire recurring units consists of the unit of formula (I), and
2. the remainder being a recurring unit of the formula

  (IV)

wherein R" is the same as R in formula (I), preferred R" groups being the preferred R groups exemplified hereinabove; the symbol - - - - represents the presence or absence of a bond; D is the same as R' in formula (II), preferred groups D being the preferred R' groups exemplified hereinabove; and $Q_1$ and $Q_2$ are identical or different, and selected from the group consisting of

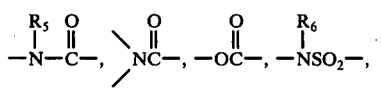

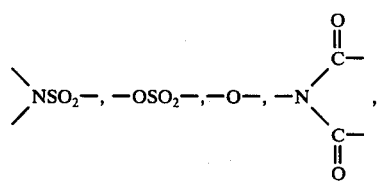

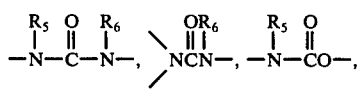

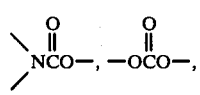

wherein $R_5$ and $R_6$ are identical or different and represent the same groups as $R_1$ and $R_2$. Especially suitable $Q_1$ and $Q_2$ groups are —O—,

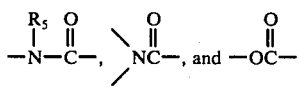

($R_5$ being the same as defined above).

Preferred aromatic imine copolymers are those in which the recurring unit of formula (IV) accounts for 2 to 70 mol%, especially 5 to 50 mol%, of the entire recurring units.

According to this invention, a linear aromatic imine polymer consisting essentially of a recurring unit of the formula

  (I)

wherein R, $Y_1$, Ar, Z, p and $Y_2$ are the same as those defined below, is prepared by reacting an aromatic dihalogen compound of the formula

  (V)

wherein $X_1$ and $X_2$ are idential or different halogen atoms; Z is —$SO_2$— or —CO—; p is 0 or 1, and when p is 0, —Ar— is directly bonded to $X_2$; Ar is a divalent aromatic group not containing a primary or secondary amino group, a hydroxyl group or a group substantially reactive with said amino and hydroxyl groups; $X_1$ and $(Z)_p X_2$ are bonded to the nuclear carbon atoms of the aromatic ring Ar, and when p is 0, Ar has an electron-attracting group capable of causing the nuclear carbon atoms to which $X_1$ and $X_2$ are attached to have a Hammet $\sigma$ constant of substantially at least +1, and when p is 1, Ar has an electron-attracting group capable of causing the nuclear carbon atom to which $X_1$ is bonded to have a Hammet $\sigma$ constant of substantially at least +1, with a difunctional amino-containing compound of the formula

  (VI)

wherein

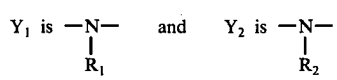

or —O—; $R_1$ and $R_2$ are identical or different and represent a hydrogen atom or a monovalent or divalent hydrocarbon residue, and when one or both of $R_1$ and $R_2$ are divalent hydrocarbon residues, $R_1$ and/or $R_2$ can be bonded to group R or directly to each other; when $Y_2$ is —O—, it is bonded to the nuclear carbon atom of the aromatic ring of R and therefore, —OH is a phenolic hydroxyl group; and R is an organic group capable of having a valence of 2, 3, or 4 according to the definition of $R_1$ and $R_2$ above, in an inert organic solvent in the presence of an acid acceptor.

Preferred electron-attracting groups attached to Ar of the aromatic dihalogen compound (V) are those capable of causing the nuclear carbons to which $X_1$ and $X_2$ are bonded (in the case of p=0) or the nuclear carbon atom to which $X_1$ is bonded (in the case of p=1) to have a Hammet $\sigma$ constant of at least 1.2, especially at least 1.4. Suitable examples include nitro, cyano, sulfone, carboxylic acid ester, carboxamide and ketone groups. The nitro, cyano, sulfone and ketone groups are especially advantageous.

Of the electron-attracting groups described above, nitro (—$NO_2$), cyano (—C≡N), sulfonic acid (—$SO_3H$), carboxyl (—COOH) and aldehyde (—CHO) groups are contained in the aromatic group (Ar) only as pendant groups such as $W_1$ or $W_2$ in formula (II) because of their inherent form. On the other hand, sulfone (—$SO_2$—),

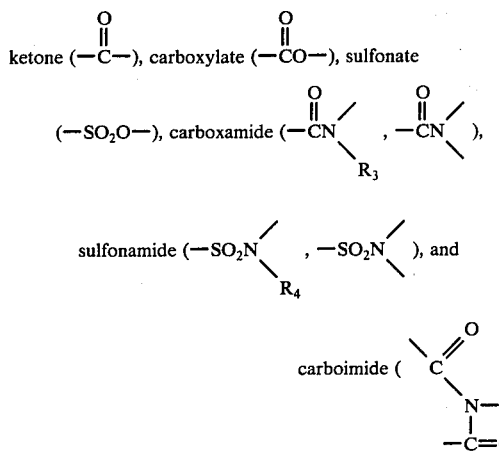

can be contained in the Ar in the form of either a pendant group as in $W_1$ or $W_2$ or a bridging group such as E or E'.

When the electron-attracting group is contained in the form of a pendant group, it specifically takes the following forms, for example:

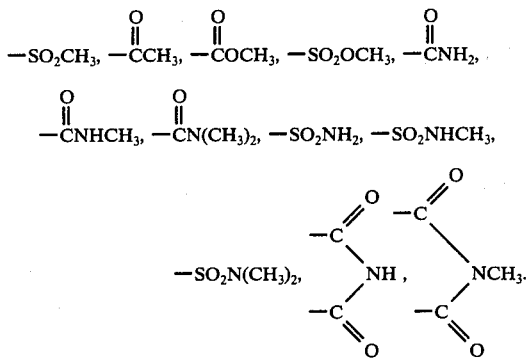

Needless to say, another alkyl group such as an ethyl group, an aryl group such as a phenyl group, an aralkyl group such as a benzyl group, an alicyclic hydrocarbon group such as a cyclohexyl group or a monovalent organic group containing a hetero element can be used instead of the methyl group in the above formulae. The group also contains a tertiary amide such as

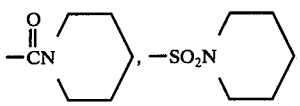

in which two N substituents can be bonded to each other.

When the above ester, amide or imide group is used as a bridging group such as E or E', it functions as a strong electron-attracting group if it is introduced in the form in which a carbonyl carbon or oxidized sulfur is bonded to $Ar_1$ or $Ar_2$.

Except $-SO_2X_2$ and

in the case of $p=1$, the above electron-attracting groups are generally required to be substantially inert under the polymer-forming conditions in the present invention. This means that these electron-attracting groups must have markedly lower reactivity with primary and secondary amino groups and a phenolic hydroxyl group under the polymer-forming conditions in the present invention than active halogen groups ($-X_1$, and $-X_2$ in the case of $p=0$) in the above formula (V).

It is known that the carboxyl, carboxylate and aldehyde groups have reactivity with amino and hydroxyl groups at elevated temperatures. When an amine-containing compound (VI) containing such a group in the Ar and having a strongly basic amino group such as aliphatic or alicyclic primary or secondary amino groups is used, it is necessary to exercise great care so that a polycondensation reaction is carried out under as mild conditions as possible.

The Hammet σ constant, as referred to in the present invention, is a parameter of the degree of reactivity of a substitution reaction on a group bonded to a nuclear carbon atom at a certain position of an aromatic group (for example, a benzene nucleus) or on the nuclear carbon atom, as is described in detail in Jack Hine, "Physical Organic Chemistry", McGraw-Hill Book Company, Inc. This degree of reactivity is affected by the degree of electron attractability or electron donatability of substituents attached to the other positions of the aromatic group.

The Hammet σ constant, as referred to in the present invention, is an arithmetic sum of the Hammet σ constants or Taft σ constants of the electron-attracting groups and electron-donating groups bonded to the aromatic group, which are determined by the positions and types of these groups.

Accordingly, in a substitution reaction on an aromatic nuclear carbon atom bonded directly to halogen ($X_1$, and $X_2$ in the case of $p=0$) using a nucleophilic reagent containing an amino group or hydroxyl group ($-Y_1H$ and $-Y_2H$), the reactivity becomes higher with larger Hammet σ constants.

The specific method for calculating the parameters is as follows:

For example, the Hammet σ constant (σ) of the nuclear carbon atoms ($C^1$) bonded to $X_1$ in an aromatic dihalogen compound of the formula

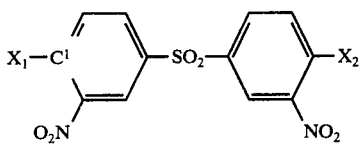

is the sum total of the Hammet σ constant ($σ_1$) ascribable to the nitro group bonded at the ortho-position of the phenyl group and the Hammet σ constant ($σ_2$) ascribable to the sulfonyl group bonded to the para-position of the phenyl group.

According to Table 4-4 at page 98 and Table 4-1 at page 87 of the above cited book, $σ_1$ = about 0.80
$σ_2$ = about 0.8 (110% of the value for $CH_3SO_2^-$)
Hence,
$σ ≈ 0.80 + 0.8$
$≈ 1.6$ By a similar calculation, the Hammet σ constant of $X_2$ is founde to be about 1.6.

In the case of 4,4'-diphenylsulfone the reaction of which with a diamine failed to afford an aromatic imine polymer according to our investigations as mentioned hereinabove, the Hammet σ constant (σ) of the nuclear carbon atom to which a chlorine atom is bonded is only $\sigma_2$, and it is about 0.8. Accordingly, this is below 1 which is the lower limit of the Hammet σ constant (σ) as specified in the present invention.

When it is difficult to calculate a Hammet σ constant of a given Ar if values for the substituents are not found in the above book or other literature references, the above parameters can be actually measured by the method disclosed at pages 81 to 103 of the above book.

Preferred species of dihalogen compounds of formula (V) $[X_1\text{-Ar}(Z)_pX_2]$ are those in which —Ar— is expressed by the following formula

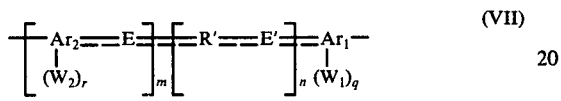
(VII)

wherein $Ar_1$, $Ar_2$, $W_1$, $W_2$, $q$, $r$, $m$, $n$, E, E', and R' are the same as defined with regard to formula (II).

The preferred groups of the symbols in the above formula (VII) are the same as those already mentioned with regard to formula (II) above.

According to this invention, an aromatic imine-containing polymer can be produced by causing a difunctional compound of the formula $$L_1\text{---}D'\text{---}L_2 \qquad (VIII)$$

wherein D' represents an organic group containing 2 to 30 carbon atoms and having a valence of 2 to 4 or two alkylene groups, the symbol ... represents the presence or absence of a bond, and $L_1$ and $L_2$ are the same or different and represent at least one member selected from the following group

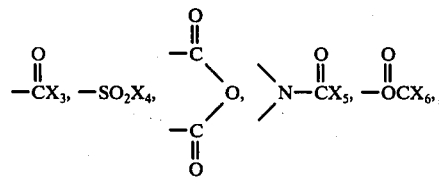

—N=C=O, >NH, —NH₂ salts (inorganic or organic strong acid salts, such as HCl or H₂SO₄ salts), and —OH, $X_4$ and $X_5$ being identical or different halogen atoms, to participate in the reaction between the aromatic dihalogen compound of formula (V) and the difunctional amino-containing compound of formula (VI).

When the above difunctional compounds are diamine salts and aminophenol, they are included within the difunctional amino-containing compounds of formula (VI). Thus, these salts are not within the scope of the copolymerizable difunctional compounds of formula (VIII).

Especially suitable $L_1$ and $L_2$ are

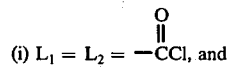
(i) $L_1 = L_2 =$ —CCl, and ii. $L_1 = L_2 =$ phenolic OH.

Suitable D' groups are the same as those exemplified with regard to R'.

In the case of (i), the difunctional compound (VIII) reacts with the difunctional amino-containing compound (VI), and in the case of (ii), it reacts with the aromatic dihalogen compound (V). In both cases, the difunctional compound (VIII) is introduced as a copolymer component into the main chain of the aromatic imine polymer of this invention.

When $L_1$ and $L_2$ in the above formula (VIII) represent the groups other than (i) and (ii) above, the difunctional compound (VIII) similarly reacts with the difunctional amino-containing compound (VI) and/or the aromatic dihalogen compound (V), and introduced as a copolymer component into the main chain of the aromatic imine polymer of this invention. When one of $L_1$ and $L_2$ is, for example,

—CX₃, and the other is >NH or —NH₂ salt, or —OH, the difunctional compound (VIII) reacts with the difunctional amino-containing compound (VI) and/or the aromatic dihalogen compound (V) while self-condensing, and thus introduced into the main chain of the aromatic imine polymer.

Now, monomers used for preparing the aromatic imine polymers of this invention will be described in detail. (1) Aromatic Dihalogen Compounds The aromatic dihalogen compounds used for the preparation of the aromatic imine polymers of this invention are expressed by the following formula $$X_1\text{—Ar}(Z)_pX_2 \qquad (V)$$

wherein $X_1$ and $X_2$ are identical or different halogen atoms; Z is —SO₂— or —CO—, $p$ is 0 or 1, and when $p$ is 0, —Ar— is directly bonded to $X_2$; Ar is a divalent aromatic group not containing a primary or secondary amino group, a hydroxyl group or a group substantially reactive with the amino and hydroxyl groups; $X_1$ and $(Z)_pX_2$ are bonded respectively to the nuclear carbon atoms of the aromatic ring Ar; and when $p$ is 0, Ar has an electron-attracting group capable of causing the nuclear carbon atoms of Ar to which $X_1$ and $X_2$ are bonded to have a Hammet σ constant of substantially at least 1, and when $p$ is 1, Ar has an electron-attracting group capable of causing the nuclear carbon atom to which $X_1$ is bonded to have a Hammet σ constant of substantially at least 1.

Specific examples of $X_1$ and $X_2$ in the above formula (V) are fluorine, chlorine, bromine and iodine. Of these, chlorine is most preferred for commercial purposes although having a lower specific activity than the other halogens. These halogen atoms represented by $X_1$ and $X_2$ are directly bonded to the nuclear carbon atoms of the aromatic group (Ar), and $X_1$ and $X_2$ are located at positions other than the orthoposition or the periposition.

Preferred species of the divalent aromatic group (—Ar—) in the aromatic dihalogen compound of the general formula (V) are those containing 6 to 50 carbon atoms, preferably 6 to 45 carbon atoms. The rings forming these aromatic groups include not only wholly conjugated aromatic ring groups such as a benzene, naphthalene, anthracene, biphenyl or terphenyl ring, but also polynuclear aromatic ring groups formed by bridging at least two of identical or different wholly conjugated aromatic ring groups of the exemplified type by various bridging groups. Examples of suitable bridging groups for bridging at least two such wholly conjugated aromatic rings are at least one member selected from the group consisting of —O—,

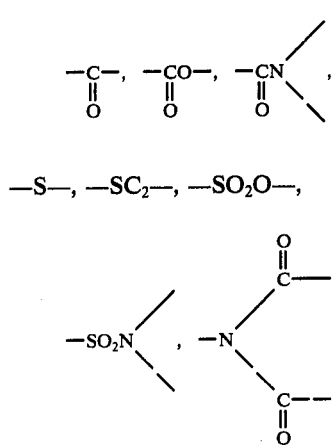

and alkylene groups containing 1 to 6 carbon atoms (in the above formulae, the symbol ... represents a hydrogen atom or the presence of a bond).

It is necessary that the aromatic dihalogen compound of formula (V) contains an electron-attracting group. Such electron-attracting groups are substantially inert to primary or secondary amino groups or hydroxyl groups under the reaction conditions of this invention. Only the —Z—$X_2$ groups in formula (V) (in which $p$ is 1) are reactive with the primary or secondary amino groups or hydroxyl groups, but can at the same time act as electron-attracting groups.

Examples of suitable electron-attracting groups are nitro, cyano, sulfone, sulfonic acid ester, sulfonamide, sulfonic acid, carboxylic acid ester, carboxamide, carboimide, carboxyl, ketone and aldehyde groups. Of these, the nitro, cyano, sulfone, sulfonate, sulfonamide, carboxylate, carboxamide, carboimide and ketone groups are especially preferred.

Especially advantageous species of the aromatic dihalogen compounds used in this invention are those expressed by the following formula

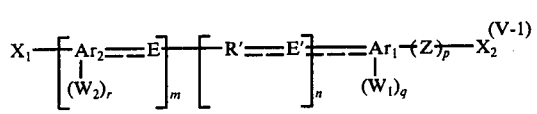

wherein $X_1$ and $X_2$ are identical or different halogen atoms, Z is —$SO_2$— or —CO—; $p$ is 0 or 1; $Ar_1$ is an aromatic ring group containing 6 to 20 carbon atoms and having a valence of $(q + 2)$ or $(q + 3)$; $Ar_2$ is an aromatic ring group containing 6 to 20 carbon atoms and having a valence of $(r + 2)$ or $(r + 3)$; $W_1$ and $W_2$ are identical or different electron-attracting groups; $m$ and $n$ are 0 or 1, and when $m$ is 0, $n$ is also 0; E and E' are identical or different and represent a non-aromatic bridging group capable of bonding $Ar_1$ to $Ar_2$, or $Ar_1$ or $Ar_2$ to an organic group (R'); the symbol - - - - represents the presence or absence of a bond; R' is an organic group containing 2 to 30 carbon atoms and having a valance of 2 to 4, or represents two divalent alkylene groups; and $q$ and $r$ are identical or different integers of 1 to 4.

Examples of suitable electron-attracting groups $W_1$ and $W_2$ in formula (V-1) are nitro, cyano, sulfonic acid ester, sulfonamide, sulfonic acid, carboxylic acid ester, carboxamide and carboxyl groups. Furthermore, examples of suitable bridging groups E and E' include

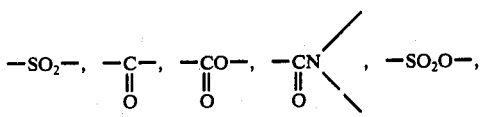

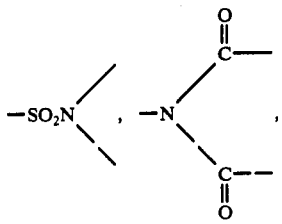

—O—, —S— and alkylene groups containing 1 to 6 carbon atoms. In the above formulae, the symbol ... represents a hydrogen atom or a monovalent hydrocarbon group, or the presence of a bond.

The aromatic dihalogen compounds expressed by formula (V-1) are classified into the following six types.

(1) $p=0, m=0, n=0$      (V-1a)

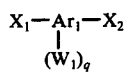

(2) $p=0, m=1, n=0$      (V-1b)

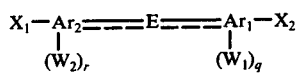

(3) $p=0, m=1, n=1$      (V-1c)

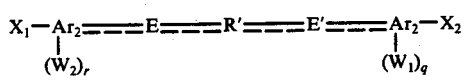

(4) $p=1, m=0, n=0$      (V-1d)

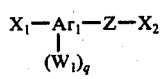

(5) $p=1, m=1, n=0$      (V-1e)

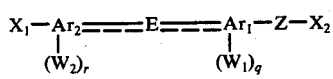

(6) $p=1, m=1, n=1$      (V-1f)

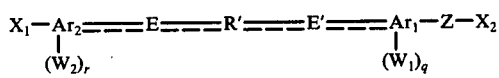

In the above formulae (V-1a) to (V-1f), $X_1$, $X_2$, $Ar_1$, $Ar_2$, $W_1$, $W_2$, $r$, $q$ and Z are the same as defined with respect to formula (V-1).

Aromatic dihalogen compounds of formulae (V-1a), (V-1b), (V-1c) and (V-1d) are preferred. Those of formula (V-1b) are especially preferred.

Examples of suitable aromatic dihalogen compounds corresponding to the above formulae (V-1a) to (V-1f) are listed below without any intention of limiting the scope of the present invention.
1. Aromatic dihalogen compounds belonging to the above formula (V-1a)
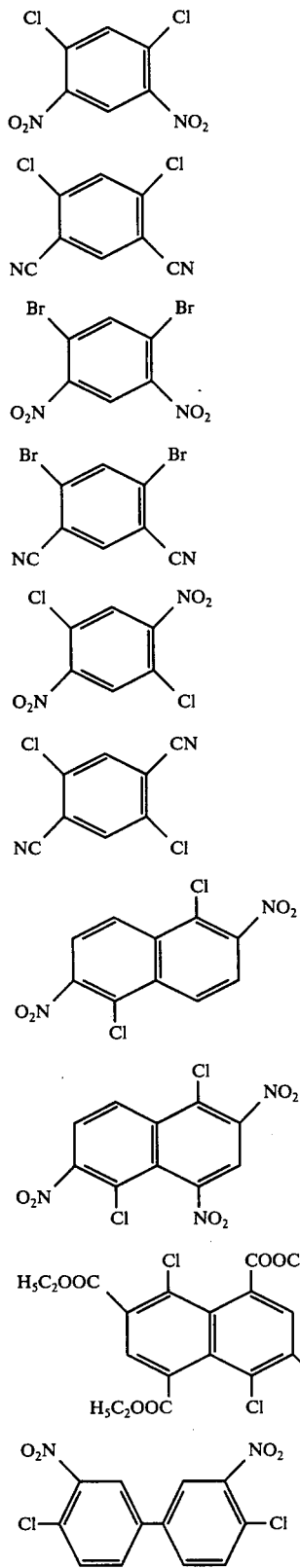
2. Aromatic dihalogen compounds belonging to the above formula (V-1b)
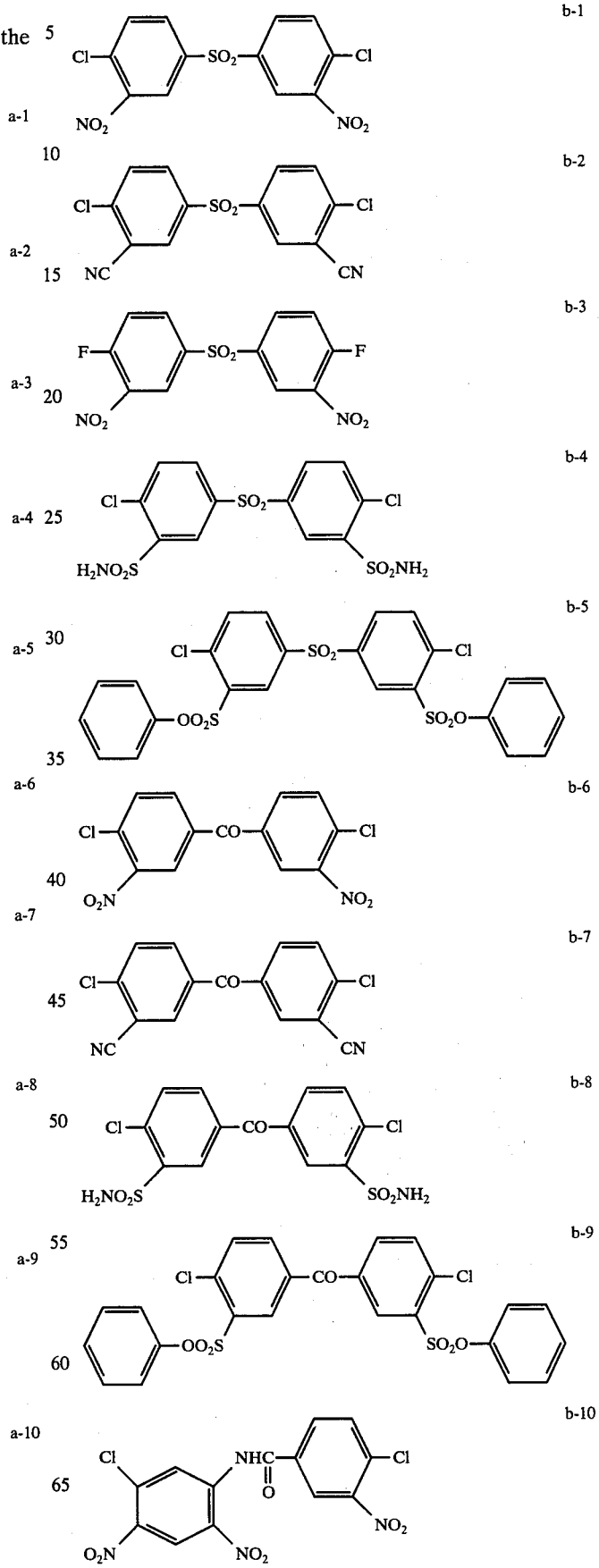

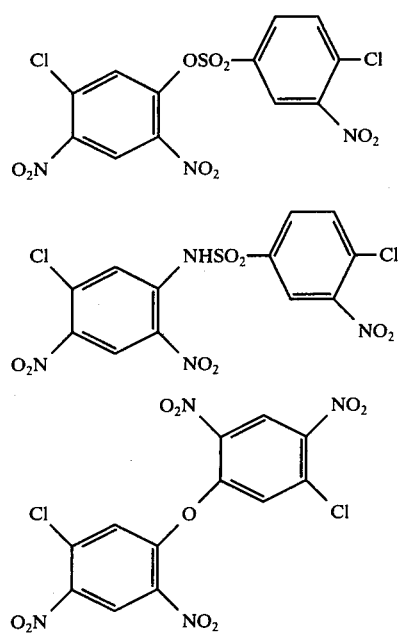
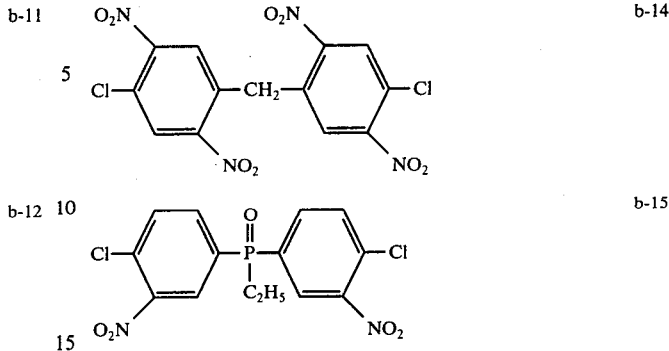
Aromatic dihalogen compounds belonging to the above formula (V-1c)
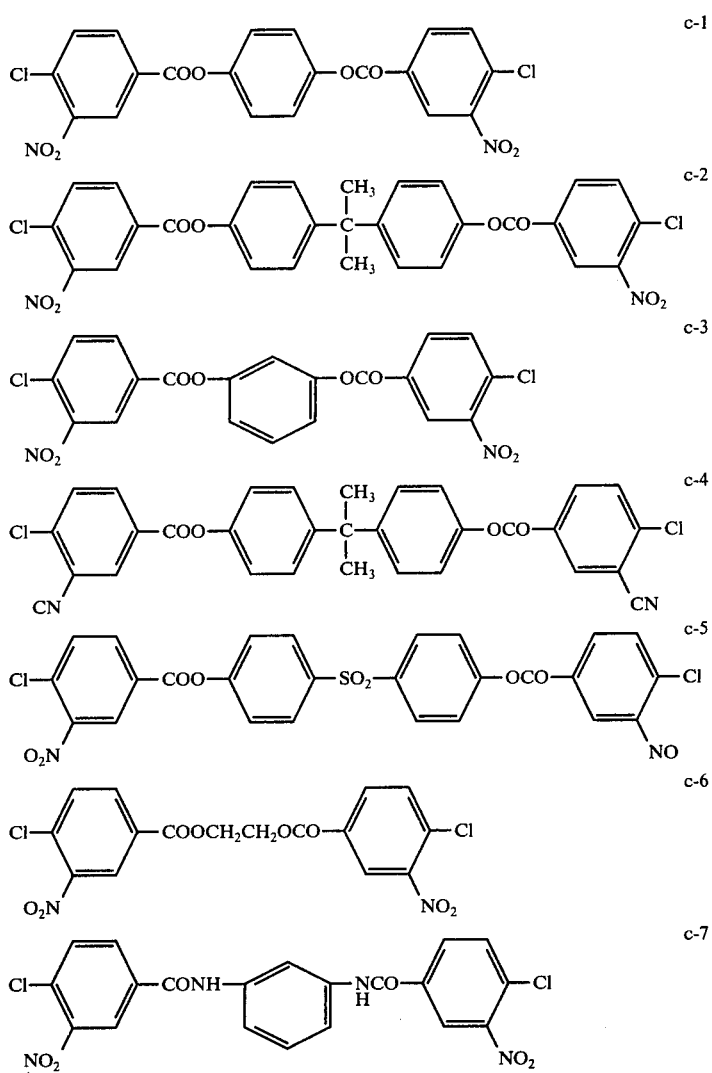

-continued
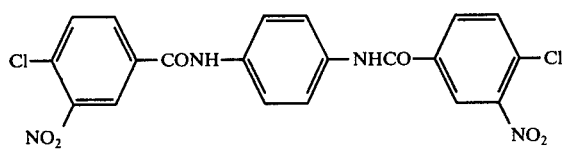
c-8
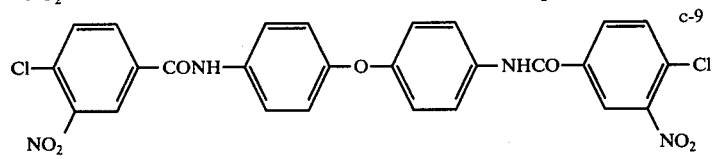
c-9
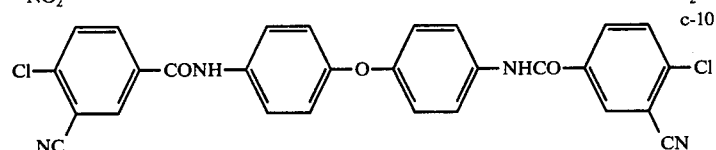
c-10
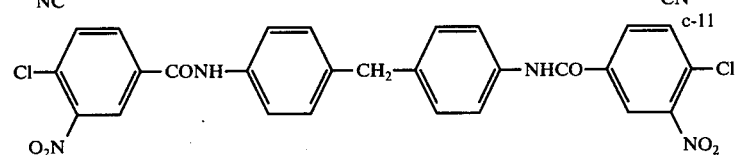
c-11
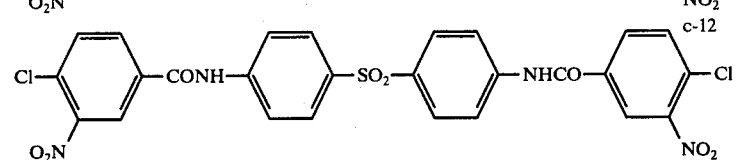
c-12
c-13
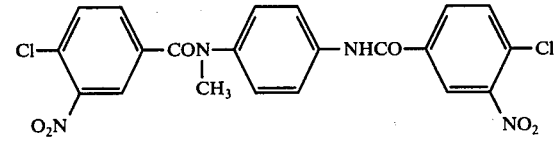
c-14
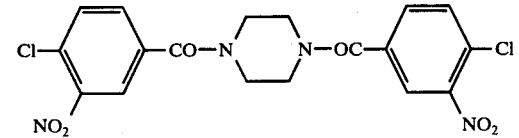
c-15
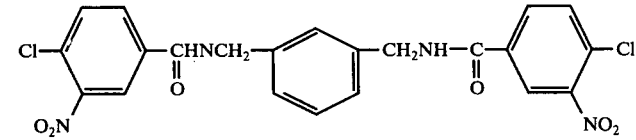
c-16
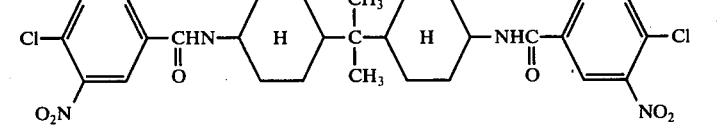
c-17
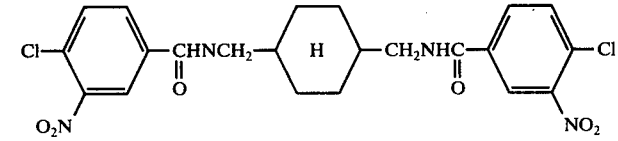
c-18
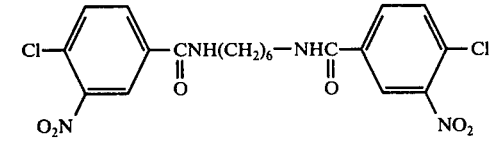
c-19
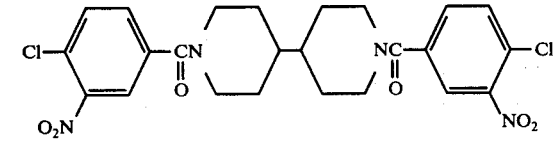

-continued
c-20
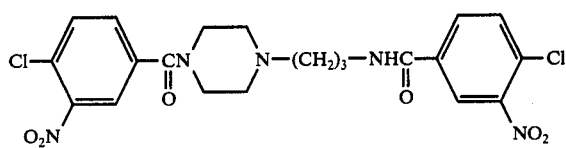
c-21
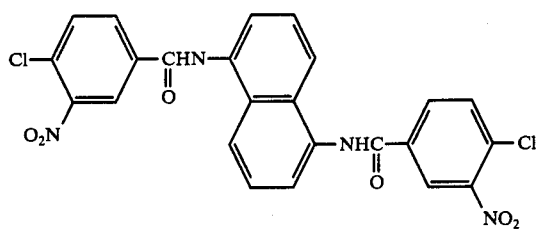
c-22
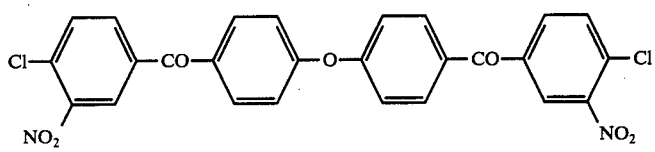
c-23
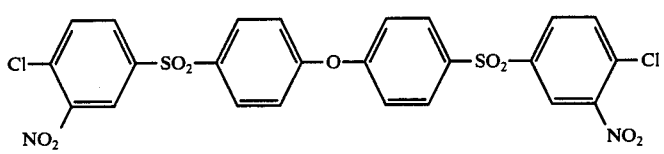
c-24
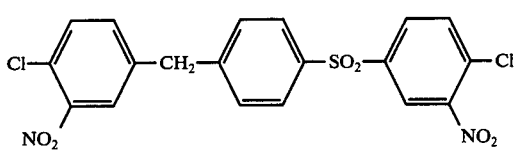
c-25
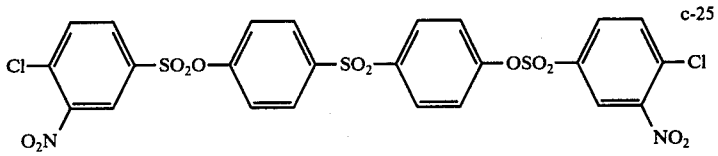
c-26
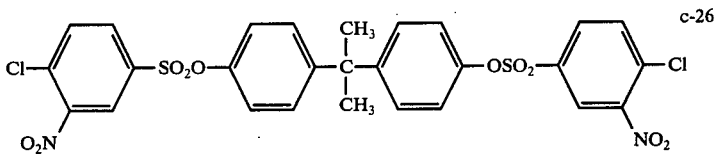
c-27
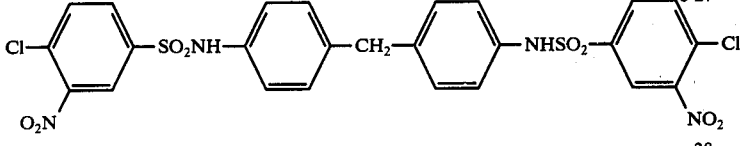
c-28
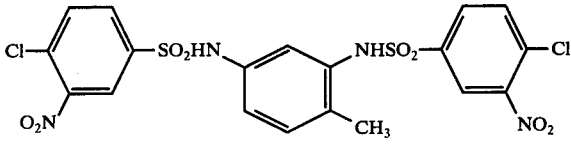
c-29
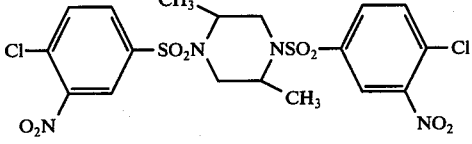
c-30
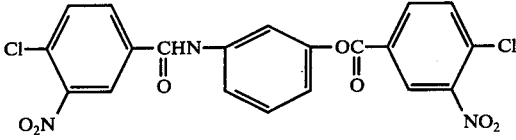

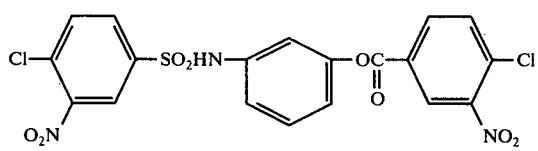
c-31
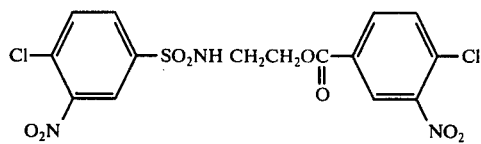
c-32
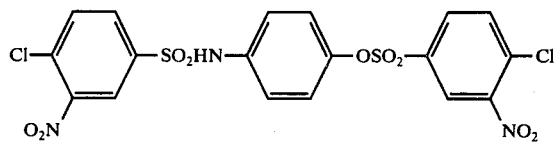
c-33
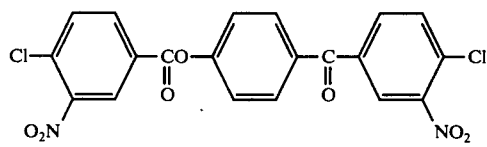
c-34
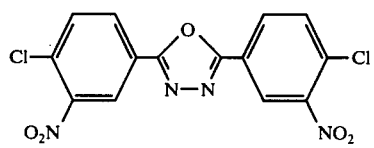
c-35
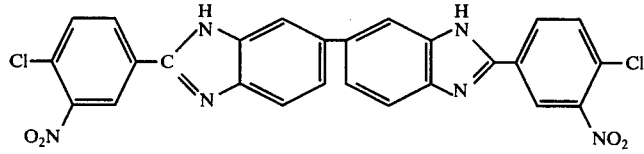
c-36
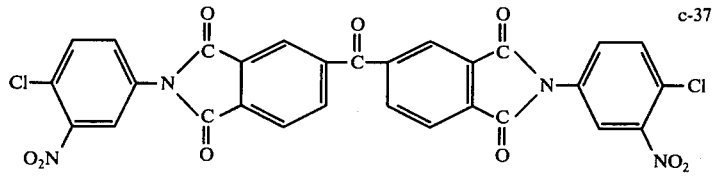
c-37
4. Aromatic dihalogen compound belonging to the above formula (V-ld)
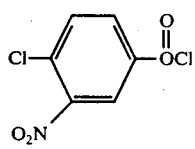
d-1
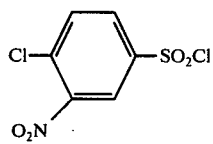
d-2
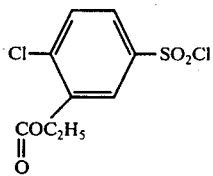
d-3
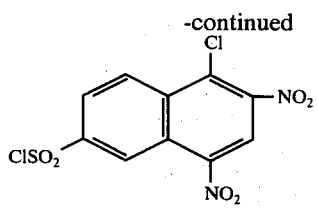
d-4
5. Aromatic dihalogen compounds belonging to the above formula (V-le)
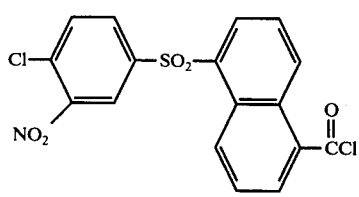
e-1
6. Aromatic dihalogen compounds belonging to the above formula (V-lf)

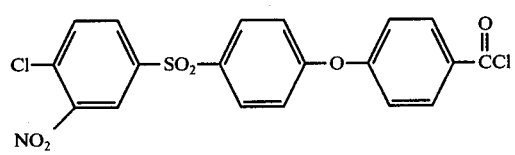 f-1

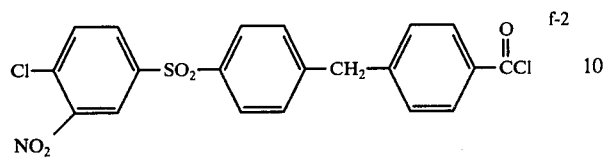 f-2

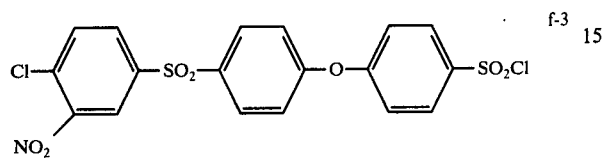 f-3

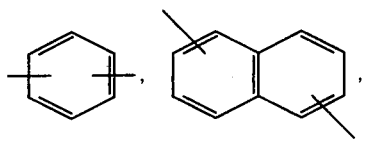

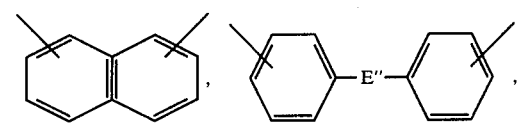

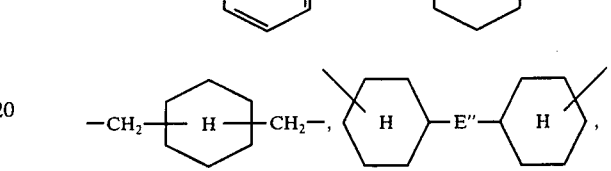

2. Difunctional Amino-Containing Compounds

The difunctional amino-containing compounds of formula (VI) to be reacted with the aromatic dihalogen compounds of formula (V) to prepare the aromatic imine polymers of this invention are expressed by the following general formula (VI)

$$H—Y_1—R—Y_2—H \qquad (VI)$$

wherein $Y_1$ is

and $Y_2$ is at least one of

and —O—, in which $R_1$ and $R_2$ are identical or different and represent a hydrogen atom or a monovalent or divalent hydrocarbon residue, and when one or both of $R_1$ and $R_2$ are divalent hydrocarbon residues, $R_1$ and/or $R_2$ can be directed either to group R or directly to each other; when $Y_2$ is —O—, it is bonded to the nuclear carbon atom of the aromatic ring R to be defined below, and therefore, in this case —OH is a phenolic hydroxyl group; and R is an organic group capable of having a valence of 2, 3 or 4 according to the definition of $R_1$ and $R_2$.

Preferred R groups are organic groups containing 2 to 50 carbon atoms. Examples of especially suitable R groups are as follows:

and alkylene groups containing 2 to 15 carbon atoms. In the above formulae, E" is the same as E or E', and preferred E" groups are the same as those exemplified with respect to E or E'.

$R_1$ and $R_2$ represent a hydrogen atom or a monovalent or divalent hydrocarbon residue, and preferred hydrocarbon residues are aliphatic hydrocarbon residues containing 1 to 10 carbon atoms, preferably 1 to 3 carbon atoms. When $R_1$ and $R_2$ are neither bonded to each other nor to R, both of them are preferably hydrogen atoms.

One example of the case of $R_1$ and $R_2$ being bonded to each other is a piperazine of the formula

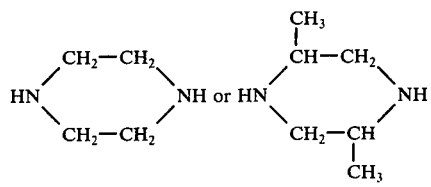

formed together with —R—.

Examples of preferred difunctional amino-containing compounds of formula (VI) are listed below without any intention of limiting the scope of the invention.

i. Difunctional amino-containing compounds (diamines) in which $Y_1$ is $-\underset{R_1}{\overset{|}{N}}-$ and $Y_2$ is $-\underset{R_2}{\overset{|}{N}}-$:

| | |
|---|---|
| $H_2N$—($CH_2$)$_2$—$NH_2$ | Ethylene diamine |
| $H_2N$—($CH_2$)$_4$—$NH_2$ | Tetramethylene diamine |
| $H_2N$—($CH_2$)$_6$—$NH_2$ | Hexamethylene diamine |
| $H_2N$—($CH_2$)$_{12}$—$NH_2$ | Dodecamethylene diamine |
| $H_2N$—$CH_2$—$CH=CH$—$CH_2$—$NH_2$ | 1,4-Diamino-butene(2) |

-continued
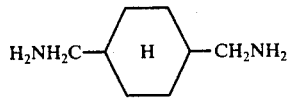
Cyclohexane-1,4-bis(methylene amine)
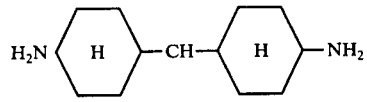
4,4′-Methylene-bis-cyclohexylamine
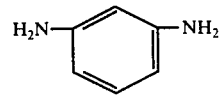
m-Phenylene diamine
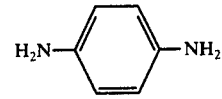
p-Phenylene diamine
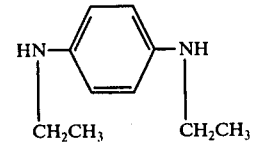
N,N′-Diethyl-p-phenyl diamine
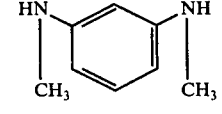
N,N′-Dimethyl-m-phenylene diamine
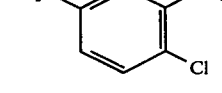
4-Chloro-m-phenylene diamine
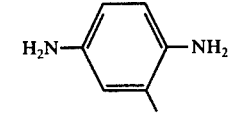
2-Nitro-p-phenylene diamine
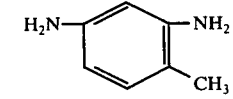
2,4-Toluylene diamine
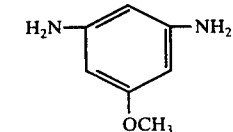
3-Methoxy-m-phenylene diamine
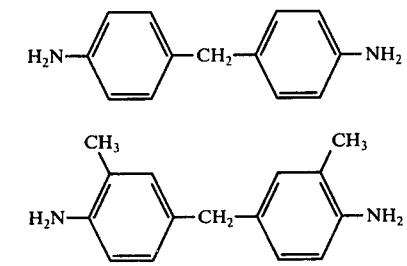
4,4′-Methylene dianiline
3,3′-Dimethyl-4,4′-diamino diphenylmethane -continued

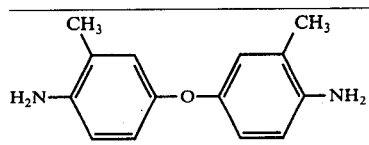 3,3'-Dimethyl-4,4'-diamino diphenylether

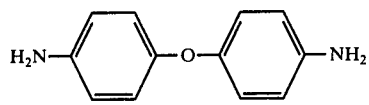 4,4'-Diamino diphenylether

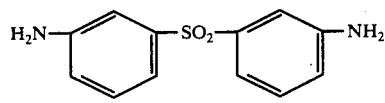 3,3'-Sulfonyl dianiline

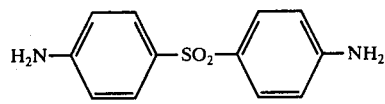 4,4'-Sulfonyldianiline

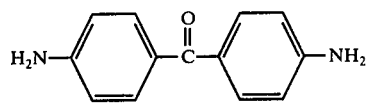 4,4'-Diaminobenzophenone

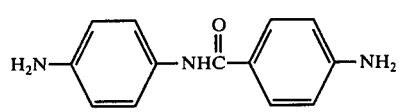 4,4'-Diaminobenzanilide

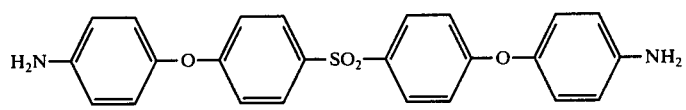

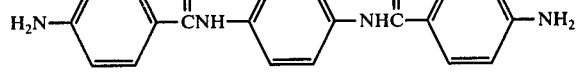 N,N'-Bis(4-amino benzoyl)-p-phenylene diamine

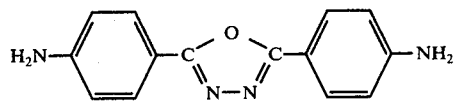 2,5-bis(p-aminophenyl)-1,3,4-oxadizole

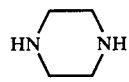 piperazine

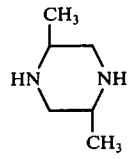 2,5-dimethyl piperazine

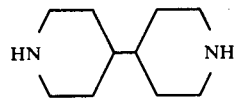 4,4'-biperidyl

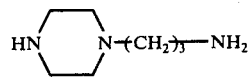 N-(γ-aminopropyl)piperazine ii. Difunctional amino-containing compounds (hydroxyamino compounds) in which $Y_1$ is

and $Y_2$ is —O—:

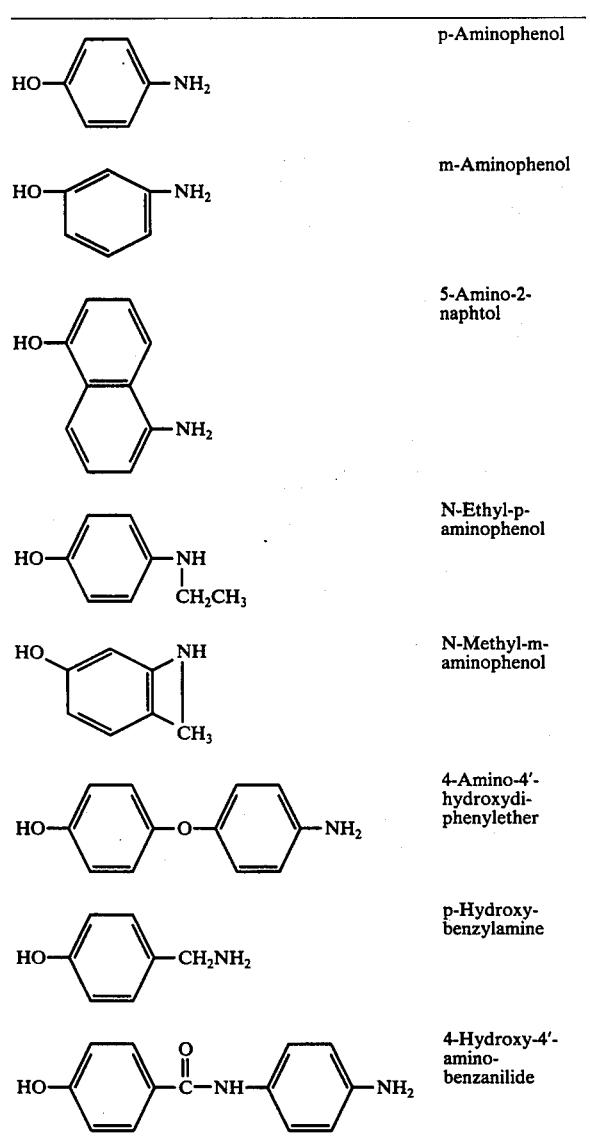

| | |
|---|---|
| HO—⟨⟩—NH₂ | p-Aminophenol |
| HO—⟨⟩—NH₂ | m-Aminophenol |
| | 5-Amino-2-naphtol |
| | N-Ethyl-p-aminophenol |
| | N-Methyl-m-aminophenol |
| HO—⟨⟩—O—⟨⟩—NH₂ | 4-Amino-4'-hydroxydiphenylether |
| HO—⟨⟩—CH₂NH₂ | p-Hydroxybenzylamine |
| | 4-Hydroxy-4'-aminobenzanilide |

3. Difunctional compounds (VIII) that can be copolymerized:

As already stated, the difunctional compounds used as a copolymer component are expressed by the following formula $$L_1\!=\!=\!=\!D'\!=\!=\!=\!L_2 \qquad (VIII)$$

wherein D', $L_1$, $L_2$ and . . . are the same as defined hereinabove.

Examples of suitable difunctional compounds of formula (VIII) are shown below.

a. Dihydroxy compounds or their functional derivatives such as:

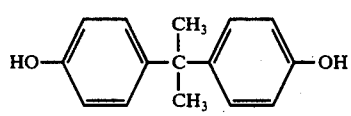

-continued

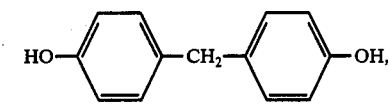

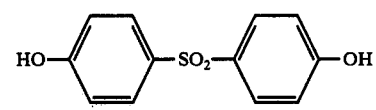

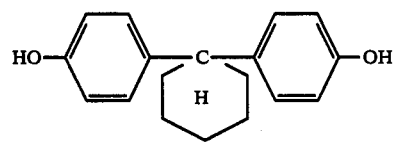

b. Monohydroxymonocarboxylic acids or their functional derivatives such as:

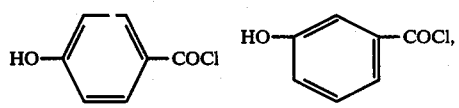

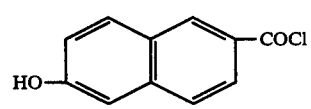

c. Monohydroxymonosulfonic acids or their functional derivatives such as:

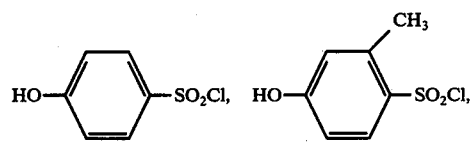

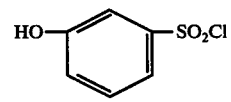

d. Monohydroxydicarboxylic anhydrides or their functional derivatives such as:

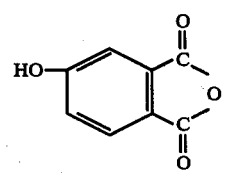

e. Monoaminomonocarboxylic acids or their functional derivatives such as:

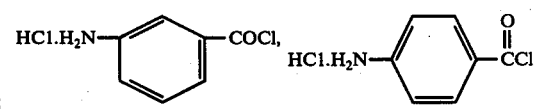

f. Monoaminomonosulfonic acids or their functional derivatives such as:

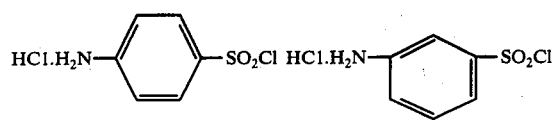

g. Dicarboxylicanhydride monosulfonic acid or their functional derivatives such as:

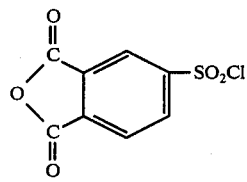

h. Dicarboxylic acids or their functional derivatives such as:

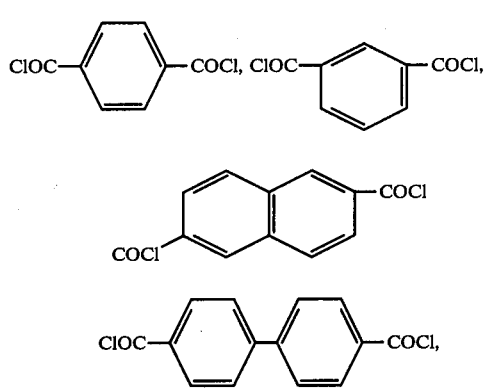

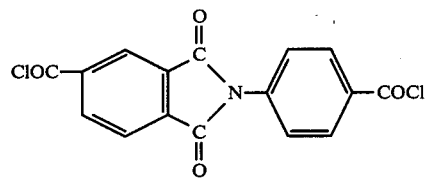

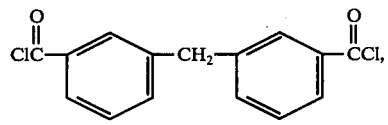
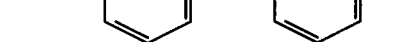

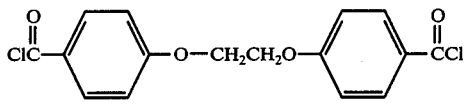

i. Monocarboxymonosulfonic acids or their functional derivatives such as:

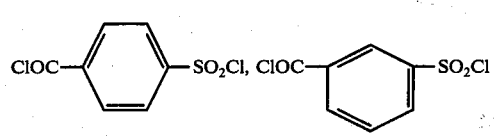

j. Tricarboxylic monohydrides or their functional derivatives such as:

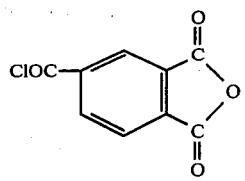

k. Tetracarboxylic dianhydrides or their functional derivatives such as:

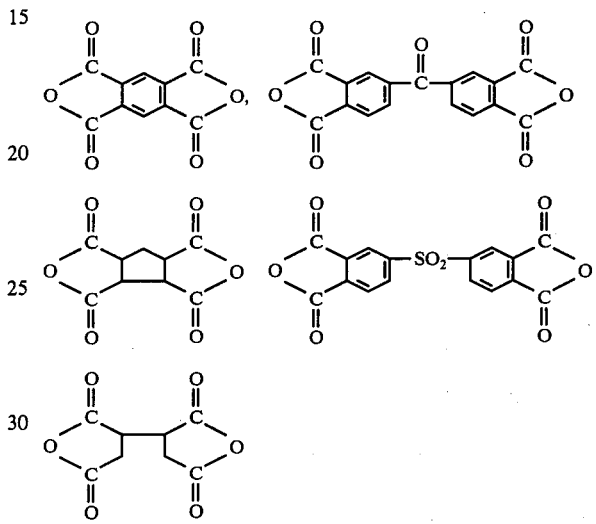

l. Diisocyanates or their functional derivatives such as:

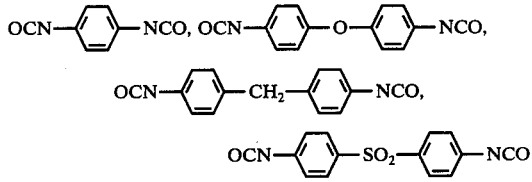

m. Monoisocyanatemonocarboxylic acids or their functional derivatives such as:

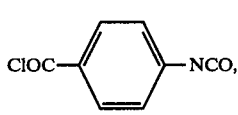

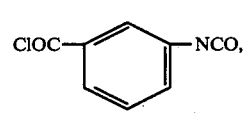

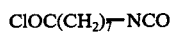

ClOC(CH$_2$)$_7$—NCO n. Bishaloformates:

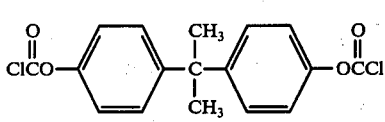

-continued

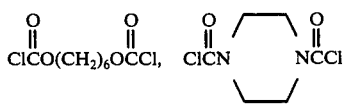

4. Reaction conditions:

According to this invention, aromatic imine polymers can be obtained by reacting (1) the aromatic dihalogen compounds (V) and (2) the difunctional amino-containing compounds (VI), with or without (3) the difunctional compounds (VIII), in an inert organic solvent in the presence of an acid acceptor.

As previously stated, the above difunctional compound (VIII) reacts with the compounds (1) and/or (2), with or without self-condensation, and is introduced into the main chain of the resulting aromatic imine polymers as a copolymer component.

Thus, according to this invention, linear aromatic imine polymers composed substantially of a recurring unit of the following formula $$-\!\!\!\left[R-Y_1-Ar(Z)_p Y_2\right]\!\!\!- \qquad (I)$$

wherein $R_1$, $Y_1$, Ar, Z, P and $Y_2$ are the same as defined hereinabove.

In the case of reacting the compounds (1), (2) and (3), linear aromatic imine copolymers in which at least 20 mol%, preferably at least 30 mol%, especially preferably at least 50 mol%, of the entire recurring units consists of a recurring unit of formula (I) and the remainder of the recurring units is expressed by the following formula

wherein R'', $Q_1$, D, $Q_2$ and ... are the same as defined hereinabove, can be obtained by controlling the amounts of these compounds so that the content of the unit of formula (I) becomes at least 20 mol% of the entire recurring units. In preparing these copolymers, it is preferred to control the amounts of the compound (3) and the compounds (1) and/or (2) to be reacted with it so that the content of the recurring unit of formula (IV) becomes 2 to 70 mol%, especially 5 to 50 mol%, of the entire recurring units of the copolymer.

In the present invention, the compounds (1), (2) and (3) above may be used alone or in combination of two or more.

The difference in the nucleophilicity of the diamine used, that is, the difference in basicity, exerts great effects on the selection of the polymerization conditions. Generally, with amines of higher basicity, polymerization can be performed under milder reaction conditions, but there is, on the other hand, a stronger possibility of the occurrence of side reactions such as the functioning of the amine itself as a strong acid acceptor. Diamines having a medium degree of basicity permit the formation of polymers having high degrees of polymerization. Trifunctional or higher polyamines can also be used in this invention so long as they do not impair the solubility of the aromatic imine polymer.

The method of polycondensation that can be employed in this invention varies according to the types of the aromatic dihalogen compound (V), the difunctional amino-containing compound (VI) to be reacted with it and the difunctional compound (VIII), and especially the activity of the aromatic dihalogen compound (V) and the basicity of the difunctional amino-containing compound (VI). Generally, an interfacial polymerization method and a solution polymerization method for the reaction of dicarboxylic acid halides and diamines can be used, for the preparation of the aromatic imine polymers.

When a copolymer is to be produced by the above polymerization methods, the dihalogen compound (V), the difunctional amino-containing compound (VI) and the difunctional compound (VIII) as a copolymer component may be reacted simultaneously from the start; or the compounds (1) and (2) are reacted first to some extent, and then the compound (3) is added to the reaction system. As another alternative, a mixture of the compounds (1) and (2) or a mixture of them which has been reacted to some extent is combined with the reaction mixture which has been obtained by reacting the compound (3) with the compounds (1) and/or (2) at least partially in a separate reaction system, and them the combined mixture is further reacted to perform the copolymerization reaction.

By the selection of such various copolymerization methods, not only random copolymers but also block copolymers can be formed.

The interfacial polymerization method is suitable for the case of using difunctional amino-containing compound (VI) of high basicity. Examples of such amino-containing compounds (VI) preferably used are aliphatic diamines such as hexamethylene diamine and alicyclic diamines such as piperazine.

The interfacial polymerization is carried out by adding a solution of the aromatic dihalogen compound (1) in an inert organic polar solvent to a solution consisting of water, the diamine, an acid acceptor, an organic solvent and an emulsifier if desired, and rapidly stirring the mixture. The diamine may be used in the form of its inorganic acid salt, rendering it free in aqueous solution by means of a calculated amount of the acid acceptor.

When the copolymer component (VIII) is used, it can be added to the interfacial polymerization system according to its solubility in, and reactivity with, water and the inert organic solvent.

Examples of suitable acid acceptors used in the interfacial polymerization method are sodium carbonate, sodium bicarbonate, potassium carbonate, magnesium carbonate, sodium hydroxide, potassium hydroxide and triethylamine. Examples of the inert organic polar solvent used in the reaction are tetrahydrofuran, methyl ethyl ketone, acetone, cyclohexanone, tetramethylene sulfone and chloroform. These organic solvents can also be used in a combination of two or more.

The polycondensation temperature that can be used is from the freeze point of a solvent having the higher freezing point among those used to the decomposition temperature of the reactants (1), (2) and/or (3). Usually, temperatures from 0° C. to 70° C. are preferred. The reaction is completed generally within 10 minutes.

On the other hand, when the polycondensation reaction is carried out by the solution method, the same solvent is used for all of the aromatic dihalogen compound (V), the difunctional amino-containing compound (VI) and if any, the copolymer component (VIII). Solutions of the respective compounds are mixed and reacted with stirring generally in an atmosphere of an inert gas. In the same way as in the interfacial polymerization method, the solvent must be substantially inert to the reactants. Examples of preferred solvents used in the solution method are dichloromethane, chloroform, dimethylformamide, N-methyl pyrrolidone, hexamethyl phosphoramide, acetonitrile, dimethyl sulfoxide, tetramethylene sulfone, 2,4-dimethyl tetramethylene sulfone and tetramethylene urea. In particular, solvents of the amide, sulfoxide and sulfone types, which belong to so-called aprotic polar solvents, are preferred. Especially preferred solvents are, for example, N-methyl pyrrolidone, dimethyl sulfoxide, tetramethylene sulfone, and 2,4-dimethyl tetramethylene sulfone.

In order to prevent side reactions, the solution polymerization should be carried out in a substantially anhydrous condition.

When reaction materials having a phenolic hydroxyl group are used, it is preferred to convert the phenolic hydroxyl group to an alkali metal phenolate beforehand. A convenient method for producing the phenolate comprises mixing an aqueous solution of an alkali hydroxide and the phenolic hydroxyl-containing reaction material with an aprotic polar solvent, then adding benzene, toluene, xylene, chlorobenzene or the like to the mixture thereby to remove water by azeotropic distillation and leaving the dehydrated phenolate solution.

Many of the above aprotic polar organic solvents can by themselves absorb the hydrohalic acid formed during the reaction, but an organic tertiary amine base such as triethylamine, dimethyl aniline, N-methyl morpholine and pyridine can be used as an acid acceptor. Furthermore, the above-mentioned inorganic bases can also be used suitably. The acid acceptor need not always be uniformly dissolved in the reaction solution, but can fully exhibit its effect even in the suspended state. For example, carbonates of alkali metals or alkaline earth metals are used suitably as acid acceptors in the suspended state. These alkali metal or alkaline earth metal carbonates as acid acceptors are preferably used in an amount at least equimolar to the hydrohalic acid formed during the reaction of this invention in order to prevent their reaction with the hydrohalic acid to form water as by-product.

A combination of N-methyl pyrrolidone as the solvent and lithium carbonate and/or calcium carbonate as the acid acceptor is very suitable in this invention.

Addition in advance of a salt such as lithium chloride, calcium chloride or magnesium chloride to the aprotic polar organic solvent often results in the increase of the solubility of the resulting polymer in the solvent or in the promotion of the polymerization reaction.

When the aromatic dihalogen compound (V) is polycondensed with the difunctional amino-containing compound (VI) in accordance with this invention, the suitable reaction temperature is from $-10°$ C. to $+200°$ C., especially from 0° C. to 170° C. When the reaction is initiated at a relatively low temperature within the above range, the reaction in later stages is desirably carried out at a temperature of at least 90° C.

When the copolymer component (VIII) is used, the reaction is sometimes initiated at a lower temperature than the lower limit of the above range, or the reaction at later stages is sometimes carried out at higher temperatures than the upper limit of the above range according to the reactivity of the copolymer component.

The reaction time is 0.1 to 50 hours, preferably 2 to 30 hours.

When the polymerization is carried out by the interfacial polymerization method or solution polymerization method described above, the amounts of the solvent and the reactants, and the proportion of the reactants are naturally varied according to the type of the solvents, the reactants used and the type of the desired polymer, but they can be easily determined. In order to obtain polymers having high degrees of polymerization in good yields, it is preferred to use the diamine component and the aromatic dihalogen compound in equimolar amounts.

The resulting polymer can be identified as an aromatic imine polymer having the recurring unit of the above formula (I) by infrared spectroscopy, nuclear magnetic resonance spectroscopy, and elemental analysis.

The resulting aromatic imine polymers have an inherent viscosity, as measured on a solution of the polymer in N-methyl pyrrolidone or at least 95% by weight conc. sulfuric acid, at 30° C. in a concentration of 0.5 g/100 ml., of 0.05 to 2.0 or even more. Aromatic imine polymers having an inherent viscosity of at least 0.1, especially at least 0.2, are preferred. Those having an inherent viscosity of 0.4 to 1.0 have especially good processability, and are suited for fabrication such as film formation.

The aromatic imine polymers, in many cases, have good solubility, and are soluble in organic polar solvents such as dimethyl formamide, dimethyl sulfoxide, N,N-dimethyl acetamide and N-methyl pyrrolidone. Fibers or film can be shaped from solutions of these polymers. These polymers further have high melting points, and can be used as thermally stable polymers depending upon the type of substituents in the polymers. When $R_1$ and/or $R_2$ in formula (I) are hydrogen atoms, the polymers also function as reducing agents and can be used as functional polymers such as image-forming materials or polymeric reducing agents.

In addition, the resulting polymers can be reacted with various reactive substances either as such or after subjecting the electron-attracting substituents remaining on the aromatic ring to chemical treatments such as reduction or hydrolysis, thereby to perform a so-called polymer reaction. As a result, various polar groups can be introduced into the aromatic nucleus of the polyimine as pendant groups. Furthermore, a heterocyclic ring can be formed in the main chain by the reaction of such a polar group with the imino group in the main chain. The resulting polymers are expected to have utility as functional polymers by using such characteristics as their hygroscopic and photo-sensitive characteristics. Furthermore, the aromatic imine polymers obtained in accordance with this invention can be used commercially as precursors of such functional polymers.

The following Examples and Comparative Examples illustrate the present invention without any intention of limiting its scope.

Unless otherwise specified, the inherent viscosity ($\eta_{inh}$) of the polymer is measured on an N-methyl pyrrolidone solution of the polymer in a concentration of 0.5 g/100 ml.

EXAMPLE 1

In a 300 ml. three-necked flask equipped with a nitrogen introducing tube, a cooler and a stirrer, 10.0 g (0.05 mol) of 4,4'-diaminodiphenyl ether and 10.6 g (0.1 mol) of sodium carbonate were dissolved in 120 ml. of dimethyl sulfoxide. Sodium carbonate was present undissolved in the solution. With stirring, 18.85 g (0.05 mol)

of 3,3'-dinitro-4,4'-dichlorodiphenylsulfone was placed in the flask at room temperature. The solution turned reddish brown. The temperature was raised to 120° C., and the reaction was continued for 20 hours to afford a reddish brown viscous solution.

The solution was poured into a large amount of water. The precipitate was fully washed and dried to afford a polymer as a reddish orange powder. The resulting polymer had an inherent viscosity ($\eta_{inh}$) of 1.00, and was soluble in amide-type solvents such as N-methyl pyrrolidone, N,N-dimethyl acetamide or dimethyl formamide, dimethyl sulfoxide, tetramethylene sulfone, nitrobenzene, tetramethylene urea, and pyridine.

The NMR spectrum of this polymer in DMSO- $d_6$ showed

(singlet) at 9.80 ppm, benzene proton ortho to $NO_2$ (singlet) at 8.68 ppm, benzene proton ortho to —$SO_2$— (doublet) at 7.95 ppm, and others (quartet) at 7.20–7.50 ppm.

A film obtained from an N-methyl pyrrolidone solution of the polymer was tough, and in its infrared absorption spectrum, an absorption ascribable to the imine was observed at 3350 cm$^{-1}$, and an absorption ascribable to the nitro group was observed at 1560 cm$^{-1}$.

The elemental analysis values for this polymer were as follows:
Found: C 56.14%, H 3.05%, N 10.95%, S 6.72%;
Calculated: C 57.13%, H 3.17%, N 11.11%, S 6.35%

It was confirmed from the results of the infrared absorption spectrum and elemental analysis that the resulting polymer was polyimine having a recurring unit of the following formula

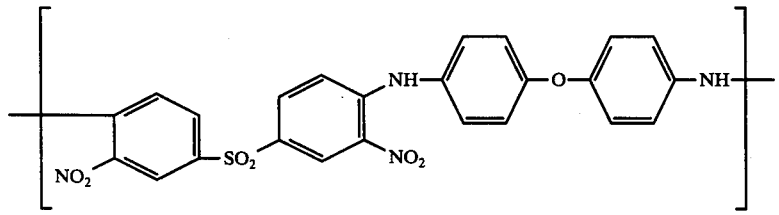

When this polymer was subjected to thermogravimetric analysis, it showed hardly any decrease in weight, nor was it softened, at a temperature of up to 300° C. at a temperature raising rate of 5° C/min.

A 15.0% by weight N-methyl pyrrolidone solution of this polymer was cast on a glass plate, and dried at 150° C. for 20 minutes and a 220° C. for 30 minutes to form a film having a thickness of 50 microns. A rectangular piece with a width of 1 cm was cut off from the film, and its elongation and strength were measured using an Instron tensile tester. The film was found to have an elongation of 10%, and a tensile strength of 10 Kg/mm$^2$.

EXAMPLE 2

In a 100 ml. three-necked flask, 1.98 g (0.01 mol) of 4,4'-diaminodiphenylmethane and 2.12 g (0.02 mol) of sodium carbonate were mixed with 20 ml. of dimethyl sulfoxide, and with stirring, 3.77 g (0.01 mol) of 4,4'-dichloro-3,3'-dinitrodiphenylsulfone was added to the solution. While maintaining the temperature at 110° C., the reaction was continued for 14 hours to afford a reddish brown viscous solution. The solution was poured into a large quantity of water to precipitate a polymer as orange-colored flakes. The resulting polymer had an inherent viscosity of 0.74. According to a solubility test, the polymer was soluble in amide-type solvents such as N-methyl pyrrolidone, and dimethyl sulfoxide. Tough films could be formed from solutions of the polymer in these solvents.

In the infrared absorption spectrum, a sharp absorption peak ascribable presumably to the imino linkage in the main chain was seen in the vicinity of 3350 cm$^{-1}$, and a marked absorption ascribably presumably to the nitro groups in the side chain was observed in the vicinity of 1560 cm$^{-1}$. Thus, the polymer was identified as the desired polyimine.

When a film prepared from this solution was heated on a hot plate to 300° C., scarcely any change occurred in the film.

EXAMPLES 3 TO 27

Using a reactor of the same type as used in Example 1, each of the aromatic diahalogen compounds and each of the diamines shown in Table 1 were reacted in equimolar proportions. The results are shown in Table 1.

In Examples 6, 13, 14 and 18, the inherent viscosity was measured in conc. sulfuric acid. The polymers obtained in these Examples were insoluble in amide-type solvent, but the other polymers were soluble in the amide-type solvents.

In Table 1, the following abbreviations were used.
PACM: bis(p-aminocyclohexyl)methane
NMP: N-methyl pyrrolidone
DMSO: dimethyl sulfoxide
TMS: tetramethylene sulfone
TEA: triethylamine Table 1

| Example | Aromatic dihalogen compound | Diamine | Polymerization solvent | Acid-aceptor | Polymerization Temp. (° C.) | Polymerization time (hr) | $\eta$ inh |
|---|---|---|---|---|---|---|---|
| 3 | Cl—(O$_2$N)C$_6$H$_3$—SO$_2$—C$_6$H$_3$(NO$_2$)—Cl | H$_2$N—C$_6$H$_4$—O—C$_6$H$_4$—NH$_2$ | NMP | TEA | 140 | 15 | 0.45 |

Table 1-continued

| Example | Aromatic dihalogen compound | Diamine | Polymerization solvent | Acid-acceptor | Polymerization Temp. (° C.) | Polymerization time (hr) | η inh |
|---|---|---|---|---|---|---|---|
| 4 | " | $H_2N-\phantom{}\text{C}_6H_4-NH_2$ (p-phenylenediamine) | DMSO | $Na_2CO_3$ | 120 | 25 | 0.32 |
| 5 | " | PACM (cis/trans mixture) | " | " | 120 | 20 | 0.38 |
| 6 | " | $H_2N-C_6H_4-C(=N-N=)O-C_6H_4-NH_2$ (oxadiazole diamine) | " | " | 120 | 20 | 0.15 ($H_2SO_4$) |
| 7 | " | 2,6-dimethylpiperazine | " | " | 120 | 20 | 0.24 |
| 8 | Cl-C_6H_3(NO_2)-SO_2-C_6H_3(NO_2)-Cl | piperazine | TMS | " | 180 | 15 | 0.22 |
| 9 | F-C_6H_3(NO_2)-SO_2-C_6H_3(NO_2)-F | PACM (cis/trans mixture) | NMP | TEA | 100 | 8 | 0.29 |
| 10 | " | PACM (cis/trans mixture) | DMSO | $Na_2CO_3$ | 30 | 10 | 0.47 |
| 11 | " | piperazine | " | " | 30 | 15 | 0.45 |
| 12 | " | $H_2N(CH_2)_6NH_2$ | " | " | 100 | 15 | 0.51 |
| 13 | 1,5-dichloro-2,4-dinitrobenzene | $H_2N-C_6H_4-O-C_6H_4-NH_2$ | " | " | 130 | 20 | 0.16 ($H_2SO_4$) |
| 14 | 1,5-difluoro-2,4-dinitrobenzene | " | " | " | 120 | 20 | 0.23 ($H_2SO_4$) |
| 15 | F-C_6H_3(NO_2)-C_6H_3(NO_2)-F | PACM (cis/trans mixture) | " | " | 130 | 15 | 0.38 |
| 16 | Cl-C_6H_3(NO_2)-SO_2-C_6H_3(NO_2)-Cl | $H_2N-C_6H_4-O-C_6H_4-NH_2$ | NMP | $Li_2CO_3$ | 100 | 20 | 0.88 |
| 17 | " | " | " | $CaCO_3$ | 100 | 20 | 0.68 |
| 18 | 1,5-dichloro-2,6-dinitronaphthalene | " | " | $Li_2CO_3$ | 100 | 20 | 0.24 ($H_2SO_4$) |
| 19 | Cl-C_6H_3(NO_2)-C_6H_3(NO_2)-Cl | " | " | " | 100 | 20 | 0.25 |
| 20 | Cl-C_6H_3(CN)-SO_2-C_6H_3(CN)-Cl | " | " | " | 100 | 20 | 0.31 |
| 21 | Cl-C_6H_3(SO_2NH_2)-SO_2-C_6H_3(SO_2NH_2)-Cl | $H_2N-C_6H_4-O-C_6H_4-NH_2$ | " | " | 120 | 20 | 0.22 |

Table 1-continued

| Example | Aromatic dihalogen compound | Diamine | Polymerization solvent | Acid acceptor | Polymerization Temp. (° C.) | Polymerization time (hr) | η inh |
|---|---|---|---|---|---|---|---|
| 22 | Cl—⌬(O₂N)—C(=O)—⌬(NO₂)—Cl | H₂N—⌬—O—⌬—NH₂ | DMSO | Na₂CO₃ | 140 | 10 | 0.31 |
| 23 | Cl—⌬(O₂N)—SO₂—⌬(NO₂)—Cl (0.08 mol); Cl—⌬(HSO₃)—SO₂—⌬(SO₃H)—Cl (0.02 mol) | H₂N—⌬—O—⌬—NH₂ (0.10 mol) | NMP | Li₂CO₃ | 100 | 20 | 0.32 |
| 24 | Cl—⌬(O₂N)—SO₂—⌬(NO₂)—Cl (0.10 mol) | H₂N—⌬—CH₂—⌬—NH₂ (0.05 mol); H₂N—⌬—O—⌬—NH₂ (0.05 mol) | DMSO | Na₂CO₃ | 140 | 20 | 0.53 |
| 25 | O₂N—⌬(Cl)—SO₂—⌬(NO₂)—Cl (0.10 mol) | H₂N—⌬—O—⌬—NH₂ (0.08 mol); H₂N—⌬—N(H)CH₃ (0.02 mol) | NMP | Li₂CO₃ | 130 | 20 | 0.42 |
| 26 | O₂N—⌬(Cl)—SO₂—⌬(NO₂)—Cl | H₂N—⌬—NHC(=O)—⌬—NH₂ | NMP | Li₂CO₃ | 100 | 24 | 0.41 |
| 27 | O₂N—⌬(Cl)—SO₂—⌬(NO₂)—Cl | H₂N—⌬—O—⌬—SO₂—⌬—O—⌬—NH₂ | NMP | CaCO₃ | 120 | 10 | 0.52 |

EXAMPLE 28

A solution of 0.58 g (0.005 mol) of bis(p-aminocyclohexyl) methane (a 20:80 mixture of cis- and trans-isomers) in 40 ml. of tetrahydrofuran was mixed with a solution of 1.06 g (0.01 mol) of sodium carbonate in 40 ml. of water in a home blender, and with vigorous stirring, a solution of 1.72 g (0.005 mol) of 4,4'-difluoro-3,3'-dinitrodiphenyl sulfone in 50 ml. of methyl ethyl ketone was quickly added.

After continued stirring for 10 minutes, the reaction mixture was diluted with a large quantity of water, and the product was filtered and washed. There was obtained a polymer having an inherent viscosity of 0.18 as a yellow fine powder. The polymer was soluble in amide-type solvents such as N-methyl pyrrolidone. The infrared absorption spectrum of a film prepared by coating a solution of the polymer on a sodium chloride plate was the same as those of the polymers obtained in Examples 9 and 10. It was identified as the desired polyimine.

COMPARATIVE EXAMPLE 1

Using the same apparatus as used in Example 1, 1.16 g (0.01 mol) of hexamethylene diamine, 2.12 g (0.02 mol) of sodium carbonate and 15 ml. of tetramethylene sulfone were mixed in a 100 ml. three-necked flask, and with stirring 2.54 g (0.01 mol) of 4,4'-difluorodiphenylsulfone was poured into the solution. After stirring the mixture at 150° C for 10 hours, it was poured into a large quantity of water, to afford, white brown acicular crystals. The crystals were filtered and dried, and then the melting point of these crystals was measured and found to be 102° to 103° C. The resulting acicular crystals were also subjected to infrared absorption spectroscopy, and found to exhibit the same spectrum as 4,4'-difluorodiphenylsulfone. This showed that the reaction hardly proceeded.

COMPARATIVE EXAMPLE 2

Using the same apparatus as in Example 1, 2.00 g (0.01 mol) of 4,4'-diaminodiphenyl ether, 2.12 g (0.02 mol) of sodium carbonate and 15 ml. of N-methyl pyrrolidone were mixed in a 100 ml. three-necked flask, and with stirring, 2.87 g (0.01 mol) of 4,4'-dichlorodiphenylsulfone was poured into the solution. After stirring at 100° C. for 20 hours, the reaction mixture was poured into a large amount of water to afford grayish white crystals. The infrared absorption spectrum of these crystals corresponded substantially with that of the starting material. This showed that the polymerization did not occur.

EXAMPLE 29

In a three-necked flask equipped with a nitrogen introducing tube, a distilling device and a stirrer, 10.9 g (0.1 mol) of p-aminophenol, 120 ml. of dimethyl sulfoxide and 100 ml. of chlorobenzene were mixed, and 0.1 mol of sodium hydroxide was added as a 50% aqueous solution to the resulting solution. With stirring, water was removed by azeotropic distillation in an atmosphere of nitrogen. The temperature was further raised to 155° to 160° C. to distill off chlorobenzene. There was obtained an anhydrous dimethyl sulfoxide solution of a sodium salt of p-aminophenol. The distilling device was replaced by a cooler.

To the resulting solution were added 21.2 g (0.2 mol) of sodium carbonate and 37.70 g (0.1 mol) of 3,3'-dinitro-4,4'-dichlorodiphenylsulfone. The temperature was gradually raised, and the reaction was performed at 120° to 140° C. for 10 hours to afford a light yellow viscous solution.

The solution was poured into water. The precipitate was thoroughly washed, and dried to afford a polymer as a light yellow powder. The resulting polymer had an inherent viscosity of 0.49, and was soluble in amide-type solvents such as N-methyl pyrrolidone or dimethyl formamide. A tough film could be prepared from an N-methyl pyrrolidone solution of the polymer. The elemental analysis values of the polymer were as follows:

Found: C 51.96%, H 2.98%, N 10.01%, S 7.54%; Calculated: C 52.30%, H 2.69%, N 10.17%, S 7.76%

From the results of the infrared absorption spectrum and the elemental analysis values, the polymer obtained was found to be polyether imine having the following recurring unit

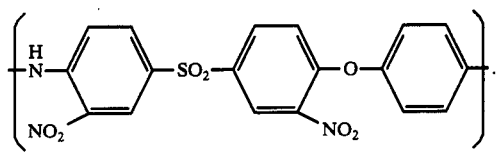

According to a thermogravimetric analysis, this polymer hardly showed any decrease in weight up to a temperature of 350° C. at a temperature raising rate of 5° C./min. in an atmosphere of nitrogen.

EXAMPLES 30 TO 33

Using the same reaction apparatus as used in Example 29, the various aromatic dihalogen compounds and hydroxyamino compounds shown in Table 2 were reacted in equimolar proportions. The results are shown in Table 2.

Where there is a reference to ($H_2SO_4$) in the column headed by $\eta_{inh}$, the inherent viscosity of the polymer was measured in conc. sulfuric acid. DMSO in the table stands for dimethyl sulfoxide.

Table 2

| Example | Dihalogen compound | Hydroxyamino compound | Polymerization solvent | Acid-aceptor | Polymerization Temp. (° C) | Polymerization time (hr) | η inh |
|---|---|---|---|---|---|---|---|
| 30 | $O_2N$-, Cl-⌬-$SO_2$-⌬-Cl, $NO_2$ | HO-⌬-$NH_2$ | DMSO | $Li_2CO_3$ | 130 | 20 | 0.35 |
| 31 | Cl-, Cl-⌬-$NO_2$, $O_2N$ (0.10 mol) | HO-⌬-$NH_2$ (0.05 mol) $H_2N$-⌬-O-⌬-$NH_2$ (0.05 mol) | DMSO | $Na_2CO_3$ | 130 | 20 | 0.22 ($H_2SO_4$) |
| 32 | Cl-⌬-$SO_2$-⌬-Cl, $SO_2NH_2$, $SO_2NH_2$ | HO-⌬-$NH_2$ | DMSO | $Na_2CO_3$ | 100 | 30 | 0.20 |
| 33 | Cl-⌬-$SO_2$-⌬-Cl, NC, CN | HO-⌬-$NH_2$ | DMSO | $Na_2CO_3$ | 100 | 24 | 0.22 |

EXAMPLE 34

In a 100 ml. three-necked flask equipped with a nitrogen introducing tube, a cooler and a stirrer, 2.00 g (0.01 mol) of 4,4'-diaminodiphenyl ether and 1.57 g (0.02 mol) of lithium carbonate were dissolved in 25 ml. of N-methyl pyrrolidone. The lithium carbonate remained undissolved in the solution. With stirring, 5.95 g (0.01 mol) of a compound of the following structural formula

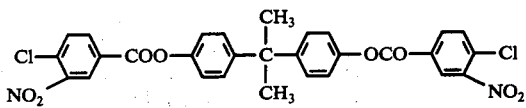

was added at room temperature. The solution turned deep red. When the temperature was raised to 100° C. and the reaction was continued for 10 hours, a deep red viscous solution was obtained.

The resulting solution was poured into a large quantity of water. The precipitate was washed thoroughly, and dried to afford a polymer as a red powder having an inherent viscosity of 0.65. The polymer was soluble in amide-type solvents such as N-methyl pyrrolidone, N,N-dimethyl acetamide or N,N-dimethyl formamide, dimethyl sulfoxide, tetramethylene sulfone, nitrobenzene, tetramethylene urea, and pyridine.

A tough film could be obtained by casting an N-methyl pyrrolidone solution of the polymer on a glass plate, and drying it.

The infrared absorption spectrum of this polymer showed an absorption ascribable to the ester in the vicinity of 1740 cm$^{-1}$ and an absorption ascribable to the imino group in the vicinity of 3350 cm$^{-1}$. The elemental analysis values of this polymer were as follows:

Found: C 67.93%, H 4.30%, N 7.50%; Calculated: C 68.13%, H 4.19%, N 7.75%

From the results of the elemental analysis values and infrared absorption spectrum, the polymer was identified as polyimine having the following recurring unit

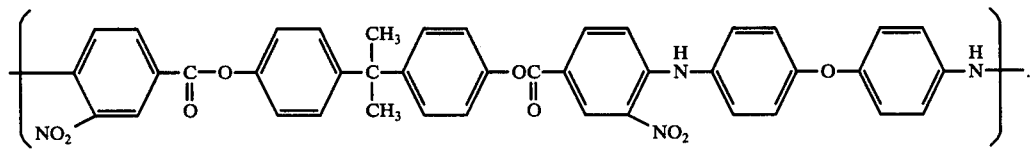

EXAMPLES 35 TO 43

Using the same apparatus as used in Example 34, the various aromatic dihalogen compounds and diamine compounds shown in Table 3 were reacted in equimolar proportions. The results are shown in Table 3. In the table, NMP stands for N-methyl pyrrolidone.

Table 3

| Example | Aromatic dihalogen compound | Diamino compound | Polymerization solvent | Acid acceptor | Polymerization Temp. (°C) | Polymerization time (hr) | η inh |
|---|---|---|---|---|---|---|---|
| 35 | (structure) | H₂N–C₆H₄–O–C₆H₄–NH₂ | NMP | Li₂CO₃ | 120 | 10 | 0.52 |
| 36 | (structure) | " | NMP | Li₂CO₃ | 100 | 10 | 0.55 |
| 37 | (structure) | " | NMP | CaCO₃ | 120 | 15 | 0.36 |
| 38 | (structure) | " | NMP | Li₂CO₃ | 120 | 10 | 0.45 |
| 39 | (structure) | " | NMP | Li₂CO₃ | 100 | 10 | 0.31 |
| 40 | (structure) | " | NMP | Li₂CO₃ | 100 | 10 | 0.45 |
| 41 | (structure) | " | NMP | CaCO₃ | 100 | 10 | 0.41 |

Table 3-continued

| Example | Aromatic dihalogen compound | Diamino compound | Polymerization solvent | Acid-aceptor | Polymerization Temp. (°C) | Polymerization time (hr) | η inh |
|---|---|---|---|---|---|---|---|
| 42 | Cl—[C6H3(NO2)]—SO2O—[C6H4]—C(CH3)2—[C6H4]—CSO2—[C6H3(NO2)]—Cl | H2N—[C6H4]—CH2—[C6H4]—NH2 (0.08 mol) | NMP | Li2CO3 | 100 | 10 | 0.44 |
| 43 | Cl—[C6H3(NO2)]—CO—[C6H4]—O—[C6H4]—CO—[C6H3(NO2)]—Cl (0.10 mol) | H2N—[C6H3(CH3)]—NH2 (0.02 mol) | NMP | Li2CO3 | 100 | 10 | 0.30 |

EXAMPLE 44

In a three-necked flask equipped with a nitrogen introducing tube, a distilling device and a stirrer, 10.9 g (0.1 mol) of p-aminophenol was dissolved in 120 ml. of dimethyl sulfoxide and 100 ml. of chlorobenzene, and 0.1 mol of sodium hydroxide was added as a 50% aqueous solution to the resulting solution. With stirring in an atmosphere of nitrogen, water was removed by azeotropic distillation. The temperature was further raised to 155° to 160° C. to distill of the chlorobenzene. There was obtained an anhydrous dimethyl sulfoxide solution of a sodium salt of p-aminophenol. Then, the distilling device was replaced by a cooler.

To the resulting solution were added 21.2 g of anhydrous sodium carbonate and 53.73 g (0.1 mol) of an aromatic dihalogen compound of the following formula

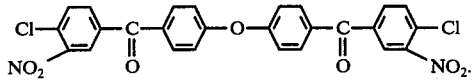

The temperature was raised gradually, and the reaction was performed at 120° to 140° C. for 10 hours to afford a light yellow viscous solution.

The solution was poured into water. The precipitate was thoroughly washed, and dried to afford a polymer as a light yellow powder having an inherent viscosity of 0.45.

The elemental analysis values of this polymer were as follows:

Found: C 66.85%, H 3.48%, N 7.59%; Calculated: C 67.01%, H 3.35%, N 7.73%

The infrared absorption spectrum of the polymer showed an absorption ascribable to the ketone at 1655 cm$^{-1}$, and an absorption ascribable to the imine in the vicinity of 3350 cm$^{-1}$.

From these results, it was confirmed that the resulting polymer was polyether imine having the following recurring unit

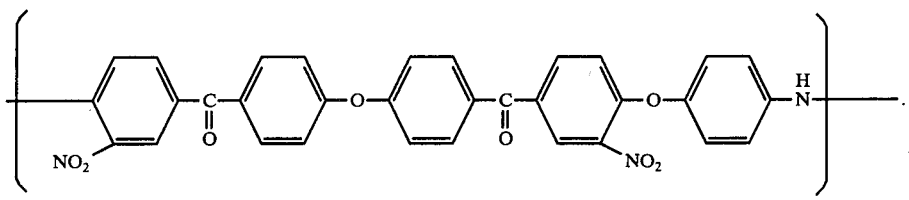

EXAMPLES 45 TO 47

Using the same reaction apparatus as used in Example 44, the various aromatic dihalogen compounds and hydroxyamino compounds were reacted in equimolar proportions. The results are shown in Table 4.

Where there is a reference to (H$_2$SO$_4$) in the column headed by $\eta_{inh}$ in Table 4, the inherent viscosity of the polymer was measured in conc. sulfuric acid. DMSO in the table stands for dimethyl sulfoxide, and NMP, for N-methyl pyrrolidone.

| Ex. | Aromatic dihalogen compound | Hydroxyamino compound | Polymerization solvent | Acid aceptor | Polymerization Temp. (°C) | Polymerization time (hr) | $\eta$ imh |
|---|---|---|---|---|---|---|---|
| 45 | Cl—[ring-C(=O)-NH-ring-O-ring-NH-C(=O)]-Cl, NO$_2$ groups | HO—ring—NH | DMSO | Na$_2$CO$_3$ | 100 | 20 | 0.42 |
| 46 | Cl—ring—C(=O)—N(piperazine)N—C(=O)—ring—Cl, NO$_2$ groups | HO—ring—NH$_2$ | DMSO | Na$_2$CO$_3$ | 130 | 20 | 0.39 (H$_2$SO$_4$) |
| 47 | Cl—ring—C(=O)—O—ring—C(CH$_3$)$_2$—ring—O—C(=O)—ring—Cl, NO$_2$ groups | HO—ring—NH$_2$ | NMP | Li$_2$CO$_3$ | 120 | 20 | 0.35 |

EXAMPLE 48

In a 100 ml. three-necked flask equipped with a nitrogen introducing tube, a cooler, and a stirrer, 2.00 g (0.01 mol) of 4,4'-diaminodiphenyl ether and 1.57 g (0.02 mol) of lithium carbonate were dissolved in 25 ml. of N-methyl pyrrolidone. The lithium carbonate remained undissolved in the solution. While cooling the reaction system with an ice bath, 2.20 g (0.01 mol) of 3-nitro-4-chlorobenzoyl chloride was poured into the solution. The reaction solution turned green. Stirring was continued for about 1 hour on an ice bath, and then the temperature was raised to 100° C. The reaction was performed for another 10 hours at this temperature, when the reaction mixture turned deep red to form a viscous solution.

The solution was poured into a large quantity of water. The precipitate was washed fully, and dried to afford a polymer as a red powder having an inherent viscosity of 0.51. The polymer was soluble in amide-type solvents such as N,N-dimethyl acetamide, and dimethyl sulfoxide.

The infrared absorption spectrum of the polymer showed characteristic absorptions at 1660 cm$^{-1}$ and 1530 cm$^{-1}$ ascribable to the amide group.

The elemental analysis values of the polymer were as follows:

Found: C 65.43%, H 3.97%, N 11.90% Calculated: C 65.69%, H 3.78%, N 12.10%

From the results of the elemental analysis and the infrared absorption spectrum, the resulting polymer was identified as a polymer having the following recurring unit

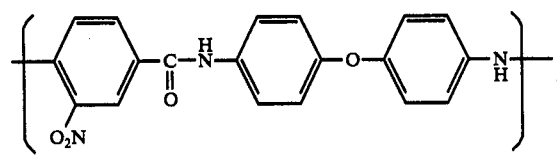

EXAMPLES 49 TO 55

Using the same reaction apparatus as used in Example 48, various compounds of formulae VI-d to VI-f and diamino compounds were reacted in equimolar proportions. The results obtained are shown in Table 5.

Where there is a reference to (H$_2$SO$_4$) in the table, the viscosity of the polymer was measured in conc. sulfuric acid (Examples 50 and 53). NMP in the table stands for N-methyl pyrrolidone.

Table 5

| Example | Compounds of groups V ld - V lf | Diamino compound | Polymerization solvent | Acid-aceptor | Polymerization temp. (° C) | Polymerization time (hr) | η inh |
|---|---|---|---|---|---|---|---|
| 49 | Cl—C₆H₃(NO₂)—COCl | H₂N—C₆H₄—CH₂—C₆H₄—NH₂ | NMP | Li₂CO₃ | 0 / 100 | 1 / 10 | 0.38 |
| 50 | Cl—C₆H₃(NO₂)—COCl | 2,5-dimethylpiperazine (H—N, N—H with CH₃ groups) | NMP | CaCO₃ | 0 / 100 | 2 / 10 | 0.20 (H₂SO₄) |
| 51 | Cl—C₆H₃(NO₂)—COCl | CH₃—NH—C₆H₄—NH₂ | NMP | Li₂CO₃ | 0 / 100 | 1 / 10 | 0.21 |
| 52 | Cl—C₆H₃(NO₂)—SO₂Cl | H₂N—C₆H₄—O—C₆H₄—NH₂ | NMP | Li₂CO₃ | 0 / 100 | 1 / 10 | 0.41 |
| 53 | Cl—C₆H₃(NO₂)—SO₂Cl | 2,5-dimethylpiperazine | NMP | CaCO₃ | 0 / 100 | 2 / 10 | 0.18 (H₂SO₄) |
| 54 | Cl—C₆H₃(NO₂)—COCl (0.05 mol) <br> Cl—C₆H₃(O₂N)—SO₂—C₆H₃(NO₂)—Cl (0.05 mol) | H₂N—C₆H₄—O—C₆H₄—NH₂ (0.10 mol) | NMP | Li₂CO₃ | 0 / 100 | 1 / 10 | 0.52 |
| 55 | Cl—C₆H₃(O₂N)—COCl (0.05 mol) <br> Cl—C₆H₃(O₂N)—SO₂—C₆H₃(NO₂)—Cl (0.05 mol) | H₂N—C₆H₄—O—C₆H₄—NH₂ (0.08 mol) <br> H₂N—C₆H₄—OH (0.02 mol) | NMP | CaCO₃ | 0 / 100 | 1 / 14 | 0.48 |

EXAMPLE 56

In a three-necked flask equipped with a nitrogen-introducing tube, a cooler and a stirrer, 4.00 g (0.02 mol) of 4,4'-diaminodiphenyl ether, 18.27 g (0.08 mol) of bisphenol A and 21.20 g (0.20 mol) of anhydrous sodium carbonate were dissolved in 200 ml. of dimethyl sulfoxide. At this time, the sodium carbonate remained undissolved. With stirring at room temperature, 37.72 g (0.10 mol) of 4,4'-dichloro-3,3'-dinitrodiphenylsulfone was added. After reacting for 1 hour at room temperature, the mixture was stirred at 100° C. for 6 hours. The solution was poured into a large quantity of water to afford a polymer as a powder having an inherent viscosity of 0.90. The polymer was soluble in amide-type solvents such as N-methyl pyrrolidone, N,N-dimethyl acetamide and N,N-dimethyl formamide, and tetramethylene urea.

A tough film could be obtained by casting an N-methyl pyrrolidone solution of the polymer and drying it. From the elemental analysis and infrared absorption spectroscopy, this polymer was identified as a copolymer having the following recurring unit

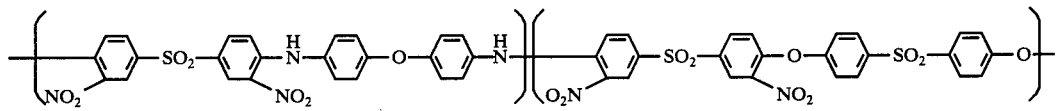

EXAMPLE 57

4,4'-Dichloro-3,3'-dinitrodiphenylsulfone was reacted in the same way as in Example 56 except that 20.02 g (0.08 mol) of bisphenol S was used instead of the bisphenol A, to afford a polymer having an inherent viscosity of 0.80. From the infrared absorption spectrum and elemental analysis, the polymer was identified as a copolymer having the following recurring unit

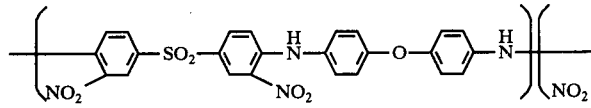

EXAMPLE 58

In a three-necked flask equipped with a nitrogen introducing tube, a cooler and a stirrer, 2.00g (0.01 mol) of 4,4'-diaminodiphenyl ether and 1.57g (0.02 mol) of lithium carbonate were dissolved in 25 ml. of N-methyl pyrrolidone. At this time, the lithium carbonate did not dissolve completely. While cooling the reaction system with an ice bath, 1.01 g (0.005 mol) of isophthaloyl chloride and 1.88 g (0.005 mol) of 4,4'-dichloro-3,3'-dinitrodiphenyl sulfone were added. After stirring for about 1 hour on an ice bath, the reaction temperature was resised to 100° C., and the reaction was continued for another 10 hours at this temperature to afford a red viscous solution. The solution was poured into a large quantity of water to form a polymer as a red solid having an inherent viscosity of 0.64. The polymer was soluble in amide-type solvents, dimethyl sulfoxide and tetramethylene urea. The infrared absorption spectrum of the polymer showed absorptions ascribable to the amide group at 1650 cm$^{-1}$ and 1530 cm$^{-1}$. From the infrared absorption spectrum and elemental analysis value, the polymer was identified as a polymer having the following recurring unit

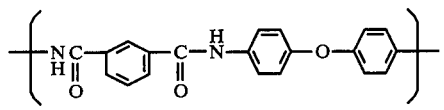

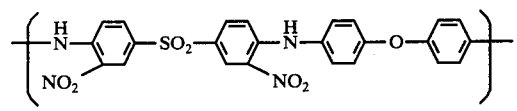

EXAMPLES 59 TO 62

Using the same reaction apparatus as used in Example 58, the dihalogen compounds and the difunctional compounds shown in Table 6 were reacted respectively to form copolymers. The results are shown in Table 6. In the table, NMP stands for N-methyl pyrrolidone.

Table 6

| Example | Dihalogen compound | Bifunctional compound | Polymerization solvent | Polymerization Acid aceptor | Polymerization temp. (° C) | Polymerization time (hr) | η inh |
|---|---|---|---|---|---|---|---|
| 59 | Cl—⟨⟩—SO$_2$—⟨⟩—Cl, NO$_2$, NO$_2$ (0.05 mol); ClC(=O)—⟨⟩—SO$_2$Cl (0.05 mol) | H$_2$N—⟨⟩—O—⟨⟩—NH$_2$ | NMP | CaCO$_3$ | 0 / 100 | 1 / 10 | 0.48 |
| 60 | Cl—⟨⟩—COCl, O$_2$N (0.08 mol) | H$_2$N—⟨⟩—O—⟨⟩—NH$_2$ (0.08 mol) | NMP | Li$_2$CO$_3$ | 0 / 100 | 1 / 10 | 0.43 |

Table 6-continued

| Example | Dihalogen compound | Bifunctional compound | Polymerization solvent | Polymerization Acid aceptor | Polymerization temp. (° C) | Polymerization time (hr) | η inh |
|---|---|---|---|---|---|---|---|
| 61 | ClCO-⟨⟩-COCl (0.02 mol) <br> OCN-⟨⟩-CH₂-⟨⟩-NCO (0.05 mol) | HO-⟨⟩-NH₂ (0.02 mol) <br> H₂N-⟨⟩-CH₂-⟨⟩-NH₂ (0.1 mol) | NMP | Li₂CO₃ | 0 / 100 | 1 / 10 | 0.88 |
| 62 | Cl-⟨NO₂⟩-SO₂-⟨NO₂⟩-Cl (0.05 mol) <br> Cl-⟨O₂N⟩-SO₂-⟨NO₂⟩-Cl (0.08 mol) <br> Cl-CO-⟨⟩-CO-Cl (0.02 mol) | H₂N-⟨⟩-O-⟨⟩-NH₂ (0.08 mol) <br> HO-⟨⟩-SO₂-⟨⟩-OH (0.02 mol) | NMP | Li₂CO₃ | 0 / 100 | 2 / 10 | 0.33 |

EXAMPLE 63

In a three-necked flask equipped with a nitrogen introducing tube, a calcium chloride tube, and a stirrer, 2.00 g (0.01 mol) of 4,4'-diaminodiphenyl ether was dissolved in 25 ml. of N-methyl pyrrolidone. The solution was fully cooled on an ice bath. To the solution was added 0.35 g (0.002 mol) of m-aminobenzoyl chloride hydrochloride, and the mixture was stirred further for about 1 hour. 1.96 g (0.025 mol) of lithium carbonate was added to the mixture, and after stirring for 10 minutes, 3.77 g (0.01 mol) of 4,4'-dichloro-3,3'-dinitrodiphenylsulfone was added. The temperature was raised to 100° C., and the polymerization reaction was continued at this temperature for 10 hours to afford a red viscous solution. When the solution was poured into a large quantity of water, a polymer was obtained as a red powder. The polymer had an inherent viscosity of 0.53. The infrared absorption spectrum of the polymer showed absorptions ascribable to the amide group at 1650 cm⁻¹ and 1530 cm⁻¹. From the results of the elemental analysis and infrared absorption spectrum, this polymer was identified as a polymer having the following recurring unit

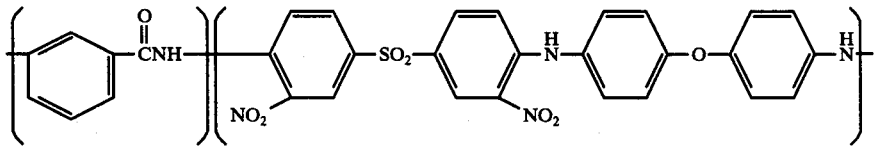

EXAMPLES 64 AND 65

Using the same reaction apparatus as used in Example 63, the same copolymerization was carried out using the compounds shown in Table 7. The results are shown in Table 7. NMP in the table stands for N-methyl pyrrolidone.

Table 7

| Example | Components of copolymer | Bifunctional compound | Polymerization solvent | Acid-aceptor | Polymerization temp. (° C) | Polymerization time (hr) | η inh |
|---|---|---|---|---|---|---|---|
| 64 | HCl·H₂N-⟨⟩-COCl (0.02 mol) <br> Cl-⟨O₂N⟩-SO₂-⟨NO₂⟩-Cl (0.1 mol) | HO-⟨⟩-SO₂-⟨⟩-OH (0.02 mol) <br> H₂N-⟨⟩-O-⟨⟩-NH₂ (0.08 mol) | NMP | Li₂CO₃ | 0 / 120 | 1 / 12 | 0.33 |
| 65 | HCl·H₂N-⟨⟩-COCl (0.02 mol) <br> Cl-⟨O₂N⟩-SO₂-⟨NO₂⟩-Cl | H₂N-⟨⟩-OH (0.02 mol) <br> H₂N-⟨⟩-CH₂-⟨⟩-NH₂ | NMP | CaCO₃ | 0 / 120 | 1 / 15 | 0.29 |

Table 7-continued

| Example | Components of copolymer (0.1 mol) | Bifunctional compound (0.08 mol) | Polymerization solvent | Acid-aceptor | Polymerization temp. (° C) | Polymerization time (hr) | η inh |
|---|---|---|---|---|---|---|---|

EXAMPLE 66

In a three-necked flask equipped with a nitrogen introducing tube, a distilling device and a stirrer, 11.32 g (0.05 mol) of 4,4'-diamino-3,3'-dimethyldiphenylmethane was dissolved in 130 ml. of N-methyl pyrrolidone. To the solution was added 3.22 g (0.01 mol) of benzophenonetetracarboxylic anhydride and 30 ml. of xylene were added. The mixture was further heated at 180° to 200° C. to distill off the xylene and remove water by azeotropic distillation. After a theoretical amount of water distilled out, the distilling device was replaced by a cooler equipped with a calcium chloride tube. The reaction system was cooled to 60° C., and with stirring, 7.84 g (0.1 mol) of lithium carbonate and 15.09 g (0.04 mol) of 4,4'-dichloro-3,3'-dinitrodiphenylsufone were added, and the mixture was heated. Stirring was continued for 10 hours at 100° C. to afford a red viscous solution.

reaction system, the distilling device was replaced by a cooler. The reaction mixture was cooled to a temperature of below 60° C., and 1.56 g (0.02 mol) of lithium carbonate was added little by little to it. Then, 3.02 g (0.008 mol) of 4,4'-dichloro-3,3'-dinitrodiphenylsulfone was added. The reaction temperature was set at 100° C., and the mixture was stirred for another 10 hours. By the addition of 4,4'-dichloro-3,3'-dinitrodiphenylsulfone, the reaction solution turned red and became viscous with time.

The reaction was poured into a large quantity of water to afford a polymer as a red powder having an inherent viscosity of 0.42. The infrared absorption spectrum of the polymer showed absorptions ascribable to the imide group at 1720 cm$^{-1}$ and 1780 cm$^{-1}$, and absorption ascribable to the amide group at 1660 cm$^{-1}$ and 1530 cm$^{-1}$. From the results of the elemental analysis and the infrared absorption spectrum, this polymer is considered to have the following recurring unit

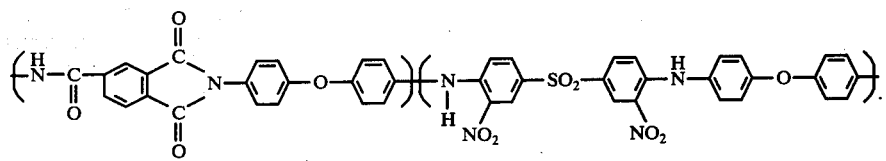

The solution was poured into a large quantity of water to afford a polymer as a red powder having an inherent viscosity of 0.52. The infrared absorption spectrum of this polymer showed characteristic absorptions ascribable to the imide group at 1780 cm$^{-1}$ and 1720 cm$^{-1}$ and an absorption ascribable to the imino group at 3350 cm$^{-1}$. From the results of the elemental analysis values and infrared absorption spectrum, this polymer was identified as a polymer having the following recurring unit

EXAMPLE 68

In a three-necked flask equipped with a nitrogen introducing tube, a cooler and a stirrer, 2.44 g (0.02 mol) of toluenediamine and 1.56 g (0.02 mol) of lithium carbonate were dissolved in 25 ml. of N-methyl pyrrolidone. While cooling the reaction system on an ice bath, 0.956 g (0.004 mol) of N,N'-dichloroformyl-2,5-dimethyl piperazine was added. After stirring the mixture for 1 hour with stirring on the ice bath, 6.03 g

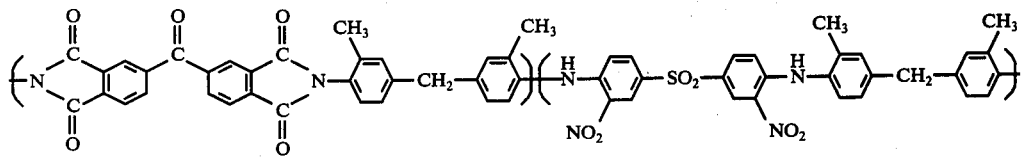

EXAMPLE 67

In a three-necked flask equipped with a nitrogen introducing tube, a distilling device and a stirrer, 2.00 g (0.01 mol) of 4,4'-diaminodiphenyl ether was dissolved in 25 ml. of N-methyl pyrrolidone. While cooling the solution on an ice bath, 0.42 g (0.002 mol) of 4-chloroformyl phthalic anhydride was added. With ice cooling, the mixture was further stirred for about 30 minutes. Then, 20 ml. or xylene was added, and the ice bath was exchanged by an oil bath, followed by heating the mixture to 150° to 170° C. Water formed was removed together with the xylene by azeotropic distillation, and after the xylene was completely removed out of the (0.016 mol) of 4,4'-dichloro-3,3'-dinitrodiphenylsulfone was added. The ice bath was replaced by an oil bath, and the mixture was heated at 120° C. for 10 hours with stirring. With the passage of time, the reaction solution assumed a red color. After the reaction, the solution was poured into a large quantity of water to form a polymer as a red powder having an inherent viscosity of 0.38.

The infrared absorption spectrum of this polymer showed an absorption ascribable to the urea group in the vicinity of 1720 cm$^{-1}$. From the results of the infrared absorption spectrum and the elemental analysis, the polymer was found to be a polymer having the following recurring unit

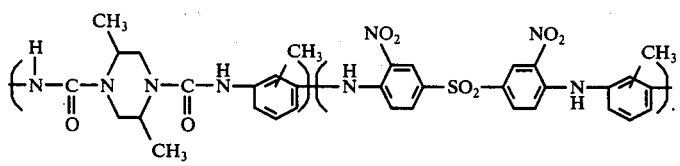

EXAMPLE 69

In a three-necked flask equipped with a nitrogen introducing tube, a cooler and a stirrer, 0.90 g (0.01 mol) of 1,4-butanediol and a catalytic amount of triethylene diamine and tin (II) octenate were dissolved in 50 ml. of N-methyl pyrrolidone under ice cooling. Then, 5.02 g (0.02 mol) of diphenylmethane-4,4'-diisocyanate was added. After stirring for about 1 hour, 4.01 g (0.02 mol) of 4,4'-diaminodiphenyl ether was added. Stirring was continued for another one hour. Then, 3.77 g (0.01 mol) of 4,4'-dichloro-3,3'-dinitrodiphenylsulfone and 1.57 g (0.02 mol) of lithium carbonate were added to the reaction system. The ice bath was replaced by an oil bath, and the mixture was stirred at 120° C. for 10 hours with stirring. After the reaction, the reaction mixture was added to a large quantity of water to afford a polymer having an inherent viscosity of 0.38. The infrared absorption spectrum of this polymer showed absorptions ascribable to the urethane and urea groups in the vicinity of 1730 cm$^{-1}$ to 1700 cm$^{-1}$.

From the results of the infrared absorption spectrum and the elemental analysis, this polymer was identified as a polymer having the following recurring unit

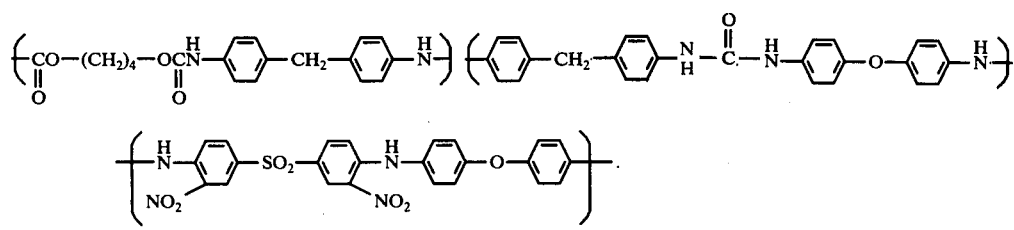

What we claim is:
1. An aromatic imine polymer comprising
  A. 100 to 20 mol%, based on its entire recurring units, of a recurring unit of the formula (I)

$$-\!\!\{R\!-\!Y_1\!-\!Ar\!\{Z\}_p Y_2\}\!\!- \qquad (I)$$

wherein Z is —SO$_2$— or —CO—; p is 0 or 1; and when p is 0, —Ar— is directly bonded to —Y$_2$—; R is an organic group of 2 to 50 carbon atoms; Ar is a divalent aromatic group not containing a primary or secondary amino group, a hydroxyl group, or a group substantially reactive with said amino and hydroxyl groups and is expressed by the following formula (II)

(II)

wherein Ar$_1$ is an aromatic ring group containing 6 to 20 carbon atoms and having a valence of (q + 2) or (q + 3); Ar$_2$ is an aromatic ring group containing 6 to 20 carbon atoms and having a valence of (r + 2) or (r + 3); W$_1$ and W$_2$ are identical or different electron-attracting groups selected from nitro, cyano, sulfonic acid ester, carboxamide, and carboxyl groups; q and r are identical or different and each represent 1, 2, 3, or 4; m and n are 0 or 1, and when m is 0, n is also 0; the symbol . . . represents the presence or absence of a bond; E and E' are identical or different non-aromatic bridging groups selected from the group consisting of

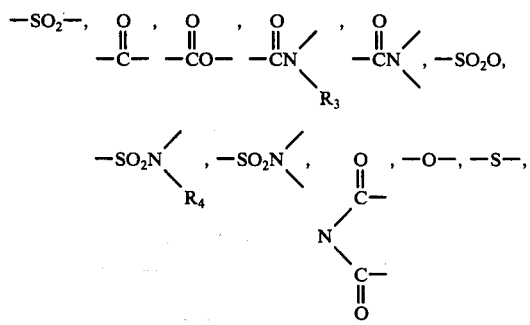

and alkylene groups containing 1 to 6 carbon atoms, R$_3$ and R$_4$ being identical or different and representing a hydrogen atom or an alkyl group containing 1 to 3 carbon atoms; and R' is a member selected from the group consisting of

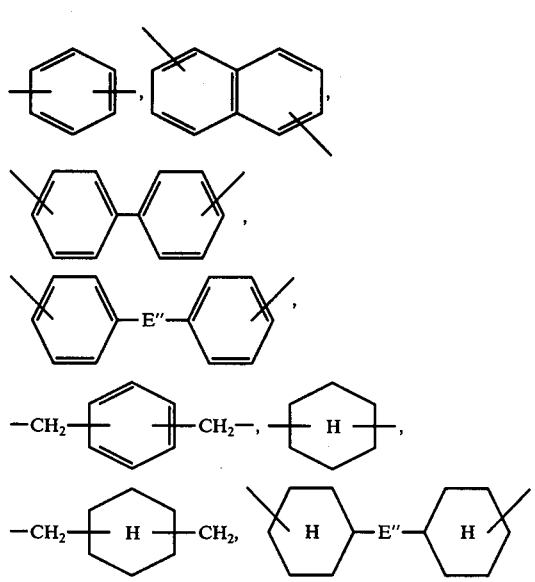

or an alkylene group containing 2 to 15 carbon atoms, wherein E" is a non-aromatic bridging group selected from one of the members of the group defining E and E', and the groups R and R' may have an inert substituent; Y$_1$ and $\{Z\}_p$Y$_2$ are bonded respectively to the nuclear carbon atoms of the aromatic ring, and when p is 0, Ar has an electron-attracting group capable of causing the nuclear carbon atoms to which Y$_1$ and Y$_2$ are bonded to have a Hammet σ constant of substantially at least +1, and when $p$ is 1, Ar has an electron-attracting group capable of causing the nuclear carbon atom to which $Y_1$ is bonded to have a Hammet σ constant of substantially at least +1; said electron-attracting group being at least one member selected from the group consisting of nitro, cyano, sulfone, sulfonic acid ester, sulfonamide, sulfonic acid, carboxylic acid ester, carboxamide, ketone and aldehyde; and $Y_1$ represents the group

and $Y_2$ represents the group

or —O—, in which $R_1$ and $R_2$ are identical or different and represent a hydrogen atom or a monovalent or divalent aliphatic hydrocarbon residual group containing 1 to 3 carbon atoms, and when one or both $R_1$ and $R_2$ are divalent aliphatic hydrocarbon residual groups containing 1 to 3 carbon atoms, $R_1$ and/or $R_2$ can be bonded to R or bonded directly to each other; and when both $R_1$ and $R_2$ are a hydrogen atom or a monovalent aliphatic hydrocarbon group, R is a divalent organic group; when one of $R_1$ and $R_2$ is a divalent atom or monovalent hydrocarbon group, R is a trivalent organic group; when both of $R_1$ and $R_2$ are a divalent hydrocarbon group, R is a divalent or tetravalent organic group; and B. the remainder (0 to 80 mol%) of the recurring units being a unit expressed by the following formula

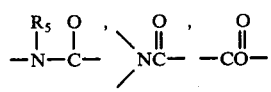   (IV)

wherein R" is an organic group of 2 to 50 carbon atoms; the symbol . . . represents the presence or absence of a bond; D is an organic group containing 2 to 30 carbon atoms and having a valence of 2 to 4; and $Q_1$ and $Q_2$ are identical or different bridging groups selected from the group consisting of

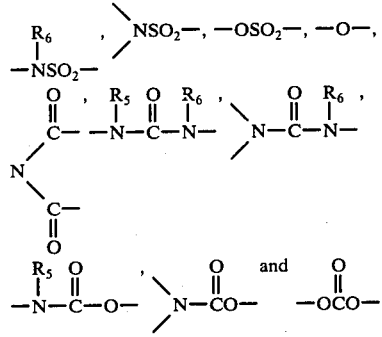

$R_5$ and $R_6$ being identical or different and representing a hydrogen atom or a monovalent or divalent hydrocarbon group having 1 to 3 carbon atoms.

2. The aromatic imine polymer of claim 1 wherein Ar in formula (I) has an electron-attracting group capable of causing the nuclear carbon atoms to which $Y_1$ and $Y_2$ are bonded (in the case of $p=0$) or the nuclear carbon atom to which $Y_1$ is bonded (in the case of $p=1$) to have a Hammet σ constant of substantially at least +1.2.

3. The aromatic imine polymer of claim 1 wherein Ar in formula (I) has an electron-attracting group capable of causing the nuclear carbon atoms to which $Y_1$ and $Y_2$ are bonded (in the case of $p=0$) or the nuclear carbon atom to which $Y_1$ is bonded (in the case of $p=1$) to have a Hammet σ constant of substantially at least +1.4.

4. A process for preparing a linear aromatic imine polymer containing from 20 to 100 mol% of a recurring unit of the formula

   (I)

wherein R, $Y_1$, Ar, Z, $p$ and $Y_2$ are defined below, and the remainder (0 to 80 mol%) of the recurring units being a unit expressed by the following formula

   (IV)

wherein R" is an organic group; the symbol . . . represents the presence or absence of a bond; D is an organic group containing 2 to 30 carbon atoms and having a valence of 2 to 4; and $Q_1$ and $Q_2$ are identical or different bridging groups selected from

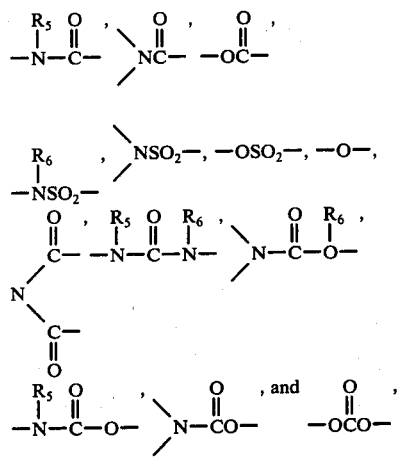

$R_5$ and $R_6$ being identical or different and representing a hydrogen atom or a monovalent or divalent hydrocarbon having 1 to 3 carbon atoms which comprises reacting at a temperature of −10° C to 200° C an aromatic dihalogen compound of the formula

wherein $X_1$ and $X_2$ are identical or different halogen atoms; Z is —SO$_2$— or —CO—; $p$ is 0 or 1, and when $p$ is 0, —Ar— is directly bonded to $X_2$; Ar is a divalent aromatic group not containing a primary or secondary amino group, a hydroxyl group or a group substantially reactive with said amino and hydroxyl groups; $X_1$ and $(Z)_pX_2$ are bonded to the nuclear carbon atoms of the aromatic ring Ar, and when $p$ is 0, Ar has an electron-attracting group capable of causing the nuclear carbon atoms to which $X_1$ and $X_2$ are attached to have a Hammet $\sigma$ constant of substantially at least +1, and when $p$ is 1, Ar has an electron-attracting group capable of causing the nuclear carbon atom to which $X_1$ is bonded to have a Hammet $\sigma$ constant of substantially at least +1;

with a difunctional amino-containing compound of the formula $$H—Y_1—R—Y_2—H \qquad (VI)$$

wherein

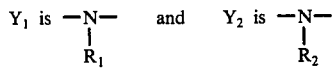

or —O—; $R_1$ and $R_2$ are identical or different and represent a hydrogen atom or a monovalent or divalent aliphatic hydrocarbon residual group having 1 to 3 carbon atoms, and when one or both of $R_1$ and $R_2$ are divalent aliphatic hydrocarbon residual groups, $R_1$ and/or $R_2$ can be bonded to group R or directly to each other; when $Y_2$ is —O—, it is bonded to the nuclear carbon atom of the aromatic ring of R and therefore, —OH is a phenolic hydroxyl group; and R is an organic group capable of having a valence of 2, 3, or 4 according to the definition of $R_1$ and $R_2$ above, when both of $R_1$ and $R_2$ are a hydrogen atom or a monovalent aliphatic hydrocarbon group, R is a divalent organic group; when one of $R_1$ and $R_2$ is a divalent hydrocarbon group and the other is a hydrogen atom or monovalent hydrocarbon group, R is a trivalent organic group; when both of $R_1$ and $R_2$ are a divalent hydrocarbon group, R is a divalent or tetravalent organic group;

in an inert organic solvent in the presence of an acid acceptor.

5. The aromatic imine polymer of claim 1 wherein said electron-attracting group is at least one member selected from the group consisting of nitro, cyano, sulfone, carboxylic acid ester, carboxamide and ketone groups.

6. The process of claim 4 wherein said aromatic dihalogen compound of formula (V) is expressed by the following formula

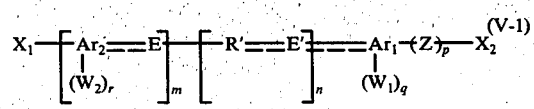

wherein $X_1$ and $X_2$ are identical or different halogen atoms; Z is —$SO_2$— or —CO—; $p$ is 0 or 1; $Ar_1$ is an aromatic ring group containing 6 to 20 carbon atoms and having a valence of ($q$ + 2) or ($q$ + 3); $Ar_2$ is an aromatic ring group containing 6 to 20 carbon atoms and having a valence of ($r$ + 2) or ($r$ + 3); $W_1$ and $W_2$ are identical or different electron-attracting groups; $m$ and $n$ are 0 or 1, and when $m$ is 0, $n$ is also 0; E and E' are identical or different and represent a non-aromatic bridging group capable of bonding $Ar_1$ to $Ar_2$, or $Ar_1$ or $Ar_2$ to an organic group (R'); the symbol . . . represents the presence or absence of a bond; R' is selected from the group consisting of

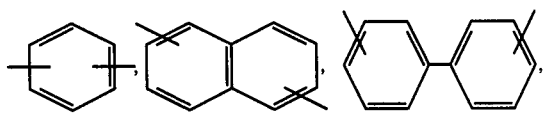

an alkylene group containing 2 to 15 carbon atoms,

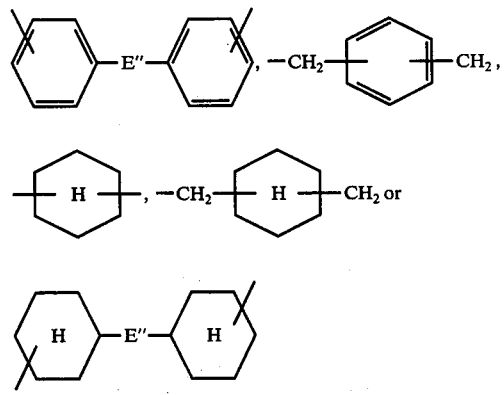

wherein E" is a non-aromatic bridging group selected from the group consisting of

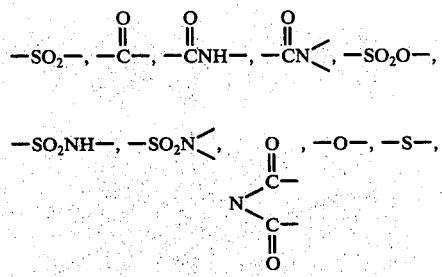

and alkylene groups containing 1 to 6 carbon atoms, and groups R' may have an inert substituent.

7. A process for preparing an aromatic imine copolymer according to claim 6 wherein a difunctional compound of the formula

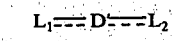

wherein D' is selected from the group consisting of alkylene of 2 to 15 carbon atoms,

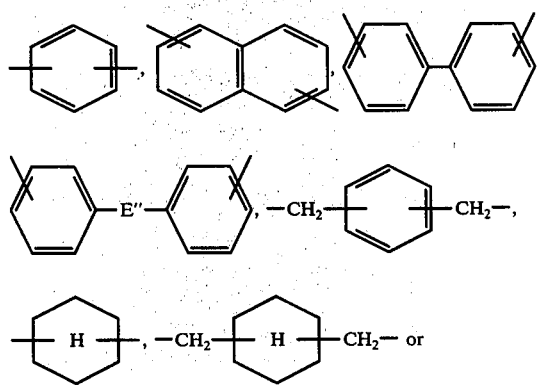

-continued

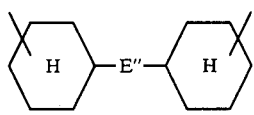

wherein E" is a non-aromatic bridging group selected from the group consisting of

and alkylene groups containing 1 to 6 carbon atoms, and groups D' may have an inert substituent; the symbol ... represents the presence or absence of a bond, and $L_1$ and $L_2$ are the same or different and represent at least one member selected from the group consisting of

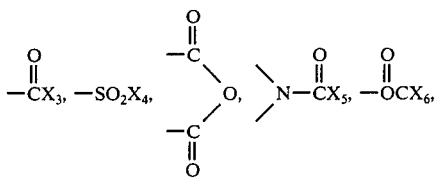

—N=C=O, >NH, —NH$_2$ salts and —OH; $X_3$, $X_4$ and $X_5$ being identical or different halogen atoms, and the salts being inorganic or organic strong acid salts, with the proviso that said formula (VIII) does not represent diamine salts or aminophenol, is caused to participate in the reaction between the aromatic dihalogen compound of formula (V-1) and the difunctional compound of formula (VI).

8. The aromatic imine polymer of claim 1 wherein —R— in formula (I) represents

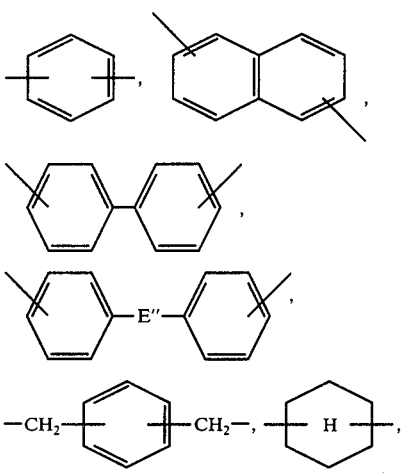

-continued or an alkylene group containing 2 to 15 carbon atoms, wherein E" is a non-aromatic bridging group selected from the group consisting of

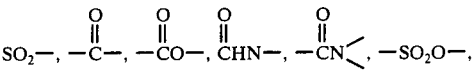

and alkylene groups containing 1 to 6 carbon atoms, and groups R may have an inert substituent.

9. An aromatic imine copolymer according to claim 1 wherein in the formula (IV), D and R" may be the same or different and are selected from the group consisting of

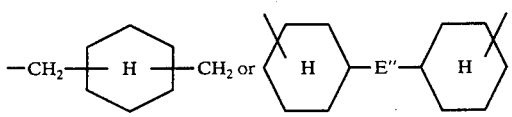

an alkylene group containing 2 to 15 carbon atoms,

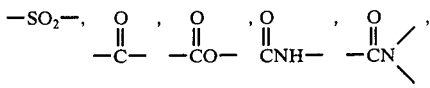

wherein E" is a non-aromatic bridging group selected from

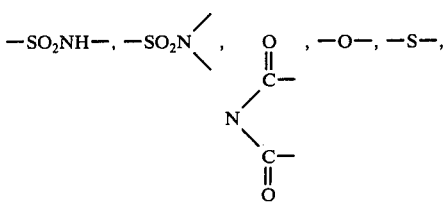

and alkylene groups containing 1 to 6 carbon atoms, and groups R" and D may have an inert substituent.

10. The aromatic imine copolymer claim 9 which comprises 98 to 30 mol%, based on the entire recurring units, of the recurring unit of formula (I) and 2 to 70 mol%, based on the entire recurring units, of the recurring unit of formula (IV).

11. The aromatic imine copolymer of claim 9 which comprises 95 to 50 mol%, based on the entire recurring units, of the recurring unit of formula (I) and 5 to 50 mol%, based on the entire recurring units, of the recurring unit of formula (IV).

12. The aromatic imine copolymer of claim 10 wherein $Q_1$ and $Q_2$ in formula (IV) represent at least one member selected from the group consisting of

$R_5$ is the same as defined in claim 9.

13. The aromatic imine polymer of claim 1 which has an inherent viscosity, measured on a solution of the polymer in N-methyl pyrrolidone or in at least 95% by weight conc. sulfuric acid in a concentration of 0.5 g/100 ml. at 30° C., of at least 0.05.

14. A polymer solution comprising an aromatic imine polymer as defined in claim 1 containing at least 20 mol%, based on the entire recurring units, of the recurring unit expressed by the formula (I), and an aprotic polar organic solvent.

15. A molded article of an aromatic imine as defined in claim 1 comprising at least 20 mol%, based on the entire recurring units, of the recurring unit expressed by the formula (I).

16. The process for preparing an aromatic imine copolymer according to claim 7 which contains at least 20 mol%, based on the entire recurring units, of a recurring unit of formula (I) wherein (1) the aromatic dihalogen compound of formula (V-1), (2) the difunctional amino-containing compound of formula (VI) and (3) the difunctional compound of formula (VIII) are reacted so that the recurring unit of the following formula $$-[R-Y_1-Ar(Z)_pY_2]- \quad (I)$$

wherein R, $Y_1$, Ar, Z, p and $Y_2$ are the same as defined above,
formed by the reaction of the aromatic dihalogen compound (V-1) with the difunctional amino-containing compound (VI) accounts for at least 20 mol% of the entire recurring units of the aromatic imine copolymer obtained.

17. The aromatic imine polymer of claim 8 wherein $Ar_1$ and $Ar_2$ in formula (II) represent at least one of benzene, naphthalene and diphenyl; $W_1$ and $W_2$ represent a nitro, cyano or sulfonamide group; and E and E' represent

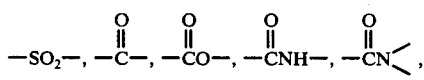

18. The process of claim 4 wherein said inert organic solvent is an aprotic polar organic solvent.

19. The process of claim 4 wherein said inert organic solvent is at least one aprotic polar organic solvent selected from the group consisting of amide, sulfoxide and sulfone solvents.

20. The process of claim 4 wherein said inert organic solvent is at least one member selected from the group consisting of N-methyl pyrrolidone, dimethyl sulfoxide, tetramethylene sulfone and 2,4-dimethyl tetramethylene sulfone.

21. The process of claim 4 wherein said inert organic solvent is N-methyl pyrrolidone and said acid acceptor is lithium carbonate or calcium carbonate or a mixture of the two.

22. The process of claim 4 wherein said reaction is carried out at a temperature in the range of 0° C to 100° C, and later stages of the reaction are performed at a temperature of at least 90° C.

23. The aromatic imine polymer of claim 1 wherein in the recurring unit of formula (I) $Y_2$ is

and p is 0 and wherein in formula (II), n is 0, $W_1$ is $NO_2$, $W_2$ is $NO_2$ and m is 1, such that said aromatic imine polymer comprises at least 20 mol%, based on its entire recurring units, of a recurring unit of the formula

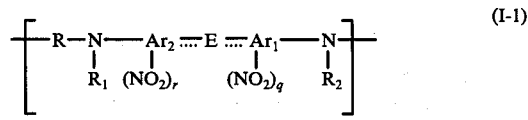

(I-1)

wherein

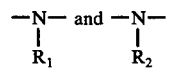

are bonded respectively to the nuclear carbon atoms of $Ar_2$ and $Ar_1$ and $(r+q)$ is sufficient to cause the nuclear carbon atoms to which

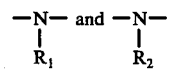

are bonded to have a Hammet $\sigma$ constant of substantially at least +1.

24. The aromatic imine polymer of claim 23 wherein, in said recurring unit of formula (I-1) r is 1, q is 1 and E is $-SO_2-$, such that said aromatic imine polymer comprises at least 20 mol%, based on its entire recurring units, of a recurring unit of formula

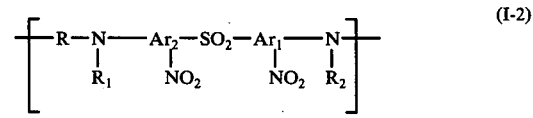

(I-2)

wherein $Ar_1$ and $Ar_2$ can be the same or different and respectively represent trivalent aromatic ring groups selected from the group consisting of benzene, naphthalene and diphenyl.

25. The aromatic imine polymer of claim 24 wherein —R— in formula (I-2) represents

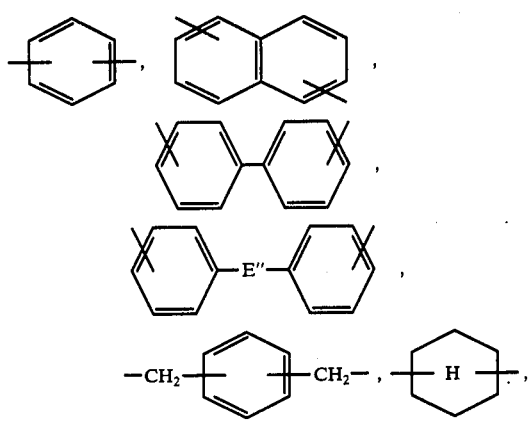

an alkylene group containing 2 to 15 carbon atoms,

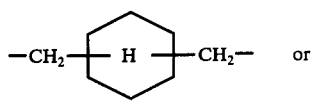 or

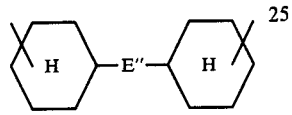

and $R_1$ and $R_2$ can be the same or different and respectively represent a hydrogen atom or a monovalent aliphatic hydrocarbon radical containing 1 to 3 carbon atoms, and E″ is a non-aromatic bridging group selected from the group consisting of —SO$_2$—,

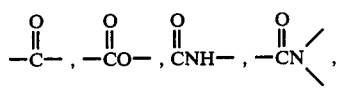

—SO$_2$O—, —SO$_2$NH—, —SO$_2$N<

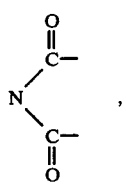

, —O—, —S—, and alkylene groups containing 1 to 6 carbon atoms, and groups R may have an inert substituent.

26. The aromatic imine polymer of claim 1 wherein, said recurring unit of formula (I) is:

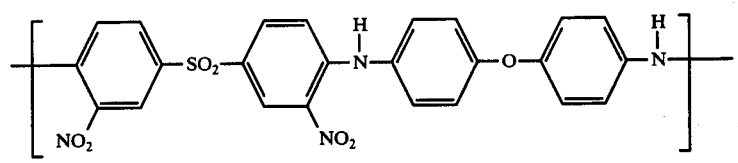

27. The process of claim 4 wherein, in said recurring unit of formula (I) —Y$_2$—is

—R— is an organic group containing 2 to 50 carbon atoms; p is 0; and —Ar— is expressed by the formula

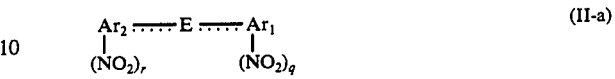
(II-a)

wherein Ar$_1$ is an aromatic ring group containing 6 to 20 carbon atoms and having a valence of (q + 2) or (q + 3); Ar$_2$ is an aromatic ring group containing 6 to 20 carbon atoms and having a valence of (r + 2) or (r + 3); q and r are identical or different and each represent 1, 2, 3, or 4; the symbol ... represents the presence or absence of a bond; E is nonaromatic bridging group selected from

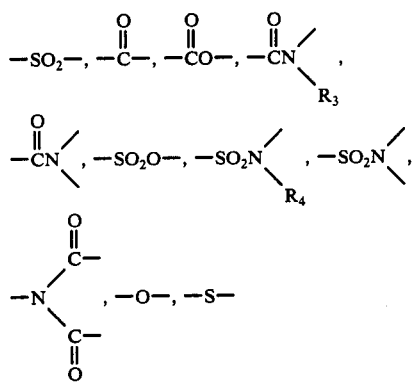

and alkylene groups containing 1 to 6 carbon atoms, $R_3$ and $R_4$ being identical or different and representing a hydrogen atom or an alkyl group containing 1 to 3 carbon atoms; such that said linear aromatic imine polymer consists essentially of a recurring unit of formula

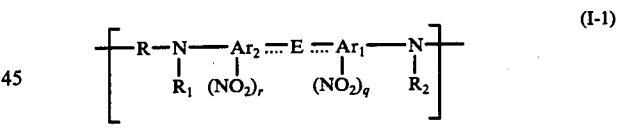
(I-1)

wherein

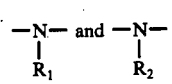

are bonded respectively to the nuclear carbon atoms of Ar$_2$ and Ar$_1$ and (r + q) is sufficient to cause the nuclear carbon atoms to which

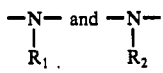

are bonded to have a Hammet σ constant of substantially at least +1.

28. The process according to claim 27 wherein, in said recurring unit of formula (I-1), r is 1, q is 1 and E is —SO₂— such that said linear aromatic polymer consists essentially of a recurring unit of formula

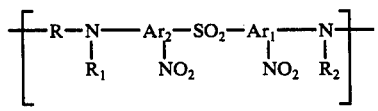
(I-2)

wherein Ar₁ and Ar₂ can be the same or different and respectively represent trivalent aromatic ring groups selected from benzene, naphthalene and diphenyl.

29. The process according to claim 28 wherein —R— in formula (I-2) represents

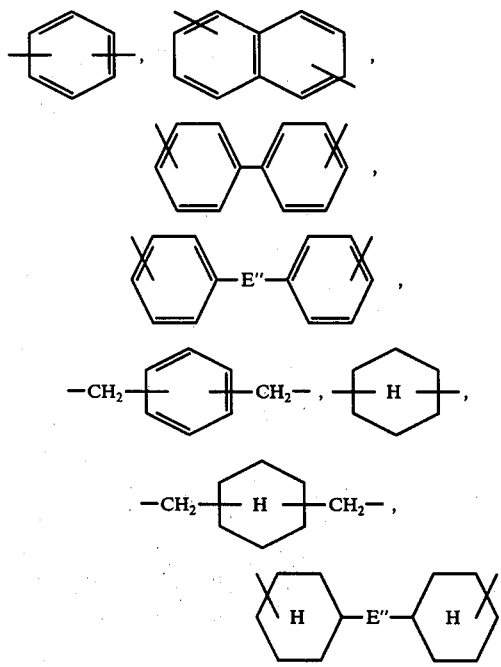

or an alkylene group containing 2 to 15 carbon atoms, and R₁ and R₂ can be the same or different and respectively represent a hydrogen atom or a monovalent aliphatic hydrocarbon radical containing 1 to 10 carbon atoms, and E″ is a non-aromatic bridging group selected from —SO₂—,

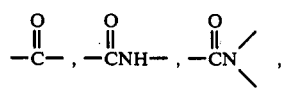

—SO₂O—, —SO₂NH—, —SO₂N<,

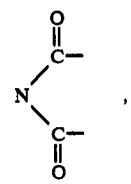

—O—, —S—, and alkylene groups containing 1 to 6 carbon atoms, and groups R may have an inert substituent.

30. The process according to claim 27, said aromatic dihalogen compound of formula (V) is selected from the group consisting of

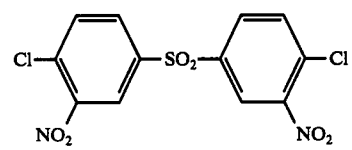
b-1

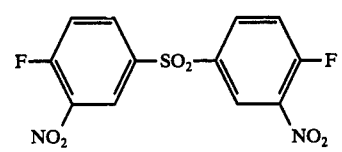
b-3

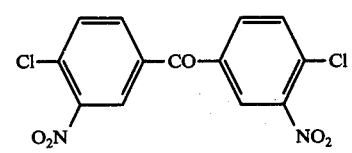
b-6

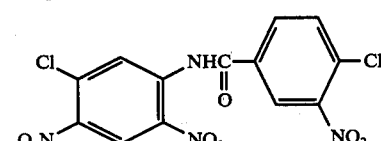
b-10

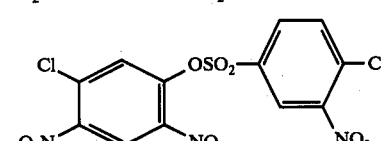
b-11

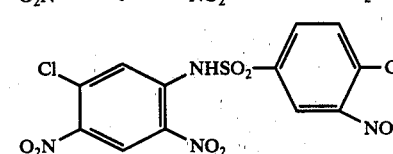
b-12

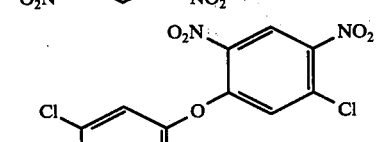
b-13

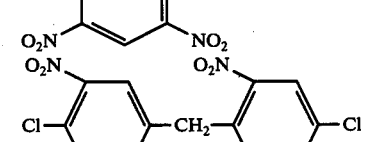
b-14

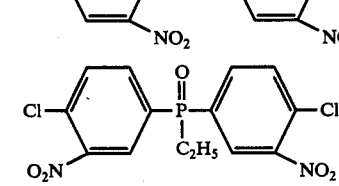
b-15 and said difunctional amino-containing compound of formula (VI) is selected from the group consisting of Ethylene diamine, Tetramethylene diamine, Hexamethylene diamine, Dodecamethylene diamine, 1,4-Diamino-butene(2), Cyclohexane-1,4-bis(methylene amine), 4,4'-Methylene-bis-cyclohexylamine, m-Phenylene diamine, p-Phenylene diamine, N,N'-Diethyl-p-phenylene diamine, N,N'-Dimethyl-m-phenylene diamine, 4-Chloro-m-phenylene diamine, 2-Nitro-p-phenylene diamine, 2,4-Toluylene diamine, 3-Methoxy-m-phenylene diamine, 4,4'-Methylene diamine, 3,3'-Dimethyl-4,4'-diamino diphenylmethane, 3,3'-Dimethyl-4,4'-diamino diphenylether, 4,4'-Diamino diphenylether, 3,3'-Sulfonyl dianiline, 4,4'-Sulfonyldiamine, 4,4'-Diaminobenzophenone, 4,4'-Diaminobenzanilide,

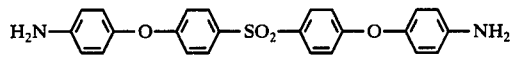

and N,N'-Bis(4-amino benzoyl)-p-phenylene diamine.

31. The process according to claim 30 wherein E is —$SO_2$— and said aromatic dihalogen compound of formula (V) is selected from the group consisting of

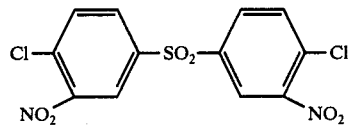

b-1 and

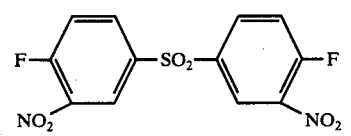

b-3

32. The process according to claim 31 wherein said difunctional amino-containing compound of formula (VI) is 4,4'-diaminodiphenyl ether and said recurring unit of formula (I) is

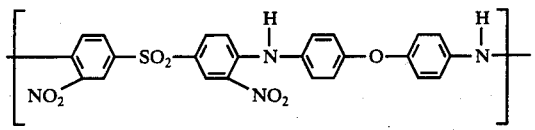

* * * * *

UNITED STATES PATENT AND TRADEMARK OFFICE
CERTIFICATE OF CORRECTION

PATENT NO. : 4,069,206  
DATED : January 17, 1978  
INVENTOR(S) : Hara, et al.

Page 1 of 2

It is certified that error appears in the above-identified patent and that said Letters Patent are hereby corrected as shown below:

Claim 4, line 8, delete formula (IV), insert
-- $\left[ R''-Q_1 \cdots D \cdots Q_2 \right]$ -- (IV) --.

Claim 6, line 4, delete formula (V-1), insert

-- $X_1 \left[ \begin{array}{c} -Ar_2 \cdots E- \\ | \\ (W_2)_r \end{array} \right]_m \left[ -R' \cdots E' \cdots \begin{array}{c} Ar_1 \\ | \\ (W_1)_q \end{array} -(Z)_p - X_2 \right]_n$ (V-1) --

Claim 7, column 67, line 39, delete ">NH", insert -- $\rangle$NH --

Claim 29, column 73, line 67, delete "---SO$_2$N<",  
insert -- ---SO$_2$N$\langle$ --.

UNITED STATES PATENT AND TRADEMARK OFFICE
CERTIFICATE OF CORRECTION

PATENT NO. : 4,069,206
DATED : January 17, 1978
INVENTOR(S) : Hara, et al.

It is certified that error appears in the above-identified patent and that said Letters Patent are hereby corrected as shown below:

Claim 32, line 4, delete

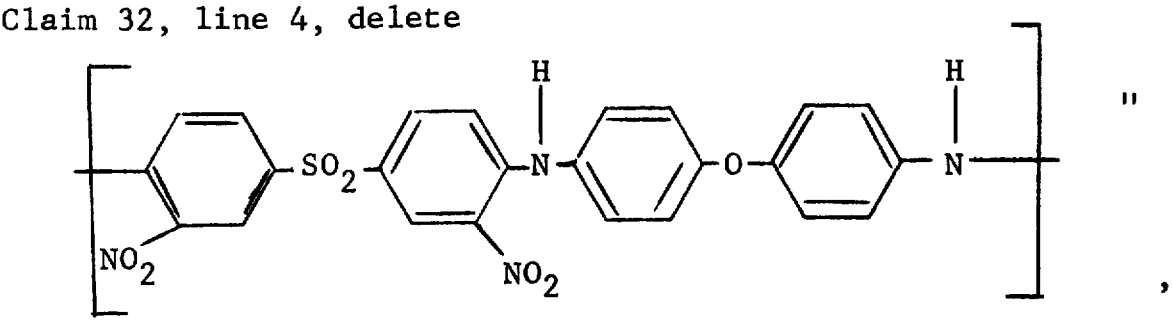

, insert

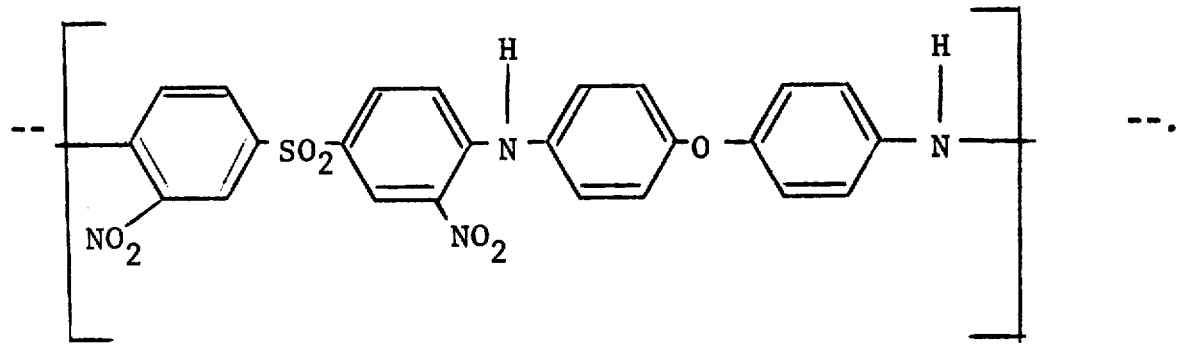

.

Signed and Sealed this

Twenty-fifth Day of July 1978

[SEAL]

Attest:

RUTH C. MASON
Attesting Officer

DONALD W. BANNER
Commissioner of Patents and Trademarks